US012761906B2

(12) United States Patent
Harata

(10) Patent No.: US 12,761,906 B2
(45) Date of Patent: Oct. 13, 2026

(54) VEHICULAR ELECTRONIC CONTROL DEVICE, REWRITING PROGRAM, AND DATA STRUCTURE

(71) Applicant: DENSO CORPORATION, Kariya-city (JP)

(72) Inventor: Yuzo Harata, Kariya City (JP)

(73) Assignee: DENSO CORPORATION, Kariya-city (JP)

( * ) Notice: Subject to any disclaimer, the term of this patent is extended or adjusted under 35 U.S.C. 154(b) by 287 days.

(21) Appl. No.: 18/481,703

(22) Filed: Oct. 5, 2023

(65) Prior Publication Data

US 2024/0028326 A1 Jan. 25, 2024

Related U.S. Application Data

(63) Continuation of application No. PCT/JP2022/013122, filed on Mar. 22, 2022.

(30) Foreign Application Priority Data

Apr. 14, 2021 (JP) ................................ 2021-068430

(51) Int. Cl.
*G06F 8/65* (2018.01)

(52) U.S. Cl.
CPC .................................... *G06F 8/66* (2013.01)

(58) Field of Classification Search
CPC ........................................................ G06F 8/66
See application file for complete search history.

(56) References Cited

U.S. PATENT DOCUMENTS

| | | | | |
|---|---|---|---|---|
| 5,012,404 | A * | 4/1991 | Pressprich .......... | G06F 13/4213 712/38 |
| 2001/0032289 | A1* | 10/2001 | Terada .................... | G06F 8/654 711/163 |
| 2018/0281748 | A1 | 10/2018 | Murase et al. | |
| 2019/0394046 | A1* | 12/2019 | Su .......................... | G06F 8/654 |
| 2020/0050378 | A1 | 2/2020 | Sakurai et al. | |
| 2020/0050442 | A1 | 2/2020 | Sakurai et al. | |
| 2020/0183676 | A1 | 6/2020 | Sakurai et al. | |
| 2020/0241771 | A1 | 7/2020 | Sakurai et al. | |

(Continued)

FOREIGN PATENT DOCUMENTS

| | | | | |
|---|---|---|---|---|
| EP | 1049062 B1 * | 2/2006 | ............... | H04L 9/40 |
| JP | 2006171803 A * | 6/2006 | ............... | G06F 8/60 |

(Continued)

*Primary Examiner* — Phillip H Nguyen
(74) *Attorney, Agent, or Firm* — Harness, Dickey & Pierce, P.L.C.

(57) ABSTRACT

A vehicular electronic control device comprises: a microcontroller including a nonvolatile memory which can store software including programs and data, the nonvolatile memory including a first area and a second area as memory areas, and a control unit which includes a first core and a second core and which executes, on at least one of the first and second cores, a rewriting program for rewriting software; and an external storage which is provided externally to the microcontroller and which temporarily stores reprogramming data for updating software. If the control unit determines a rewrite of its own software on the basis of specifications data, the control unit uses a memory area in the external storage to rewrite the software stored in the nonvolatile memory.

11 Claims, 20 Drawing Sheets

(56) References Cited

U.S. PATENT DOCUMENTS

| | | | |
|---|---|---|---|
| 2021/0155176 | A1 | 5/2021 | Harata et al. |
| 2021/0157529 | A1 | 5/2021 | Sakurai et al. |
| 2021/0157566 | A1 | 5/2021 | Sakurai et al. |
| 2021/0157567 | A1 | 5/2021 | Sakurai et al. |
| 2021/0157568 | A1 | 5/2021 | Sakurai et al. |
| 2021/0157571 | A1 | 5/2021 | Ogawa et al. |
| 2021/0157572 | A1 | 5/2021 | Harata et al. |
| 2021/0157575 | A1 | 5/2021 | Ogawa et al. |
| 2021/0157902 | A1 | 5/2021 | Sakurai et al. |
| 2022/0012043 | A1 | 1/2022 | Sakurai et al. |

FOREIGN PATENT DOCUMENTS

| | | | | | |
|---|---|---|---|---|---|
| JP | 2010198307 | A | * | 9/2010 | |
| JP | 2013254263 | A | * | 12/2013 | |
| JP | 2018173721 | A | | 11/2018 | |
| JP | 2020027627 | A | | 2/2020 | |
| JP | 2020027665 | A | * | 2/2020 | ........... G06F 9/4401 |
| JP | 202124555 | A | | 2/2021 | |
| WO | WO-2020032199 | A1 | | 2/2020 | |

* cited by examiner

FIG. 4

SPECIFICATION DATA

| ITEM | | VALUES (EXAMPLE) |
|---|---|---|
| GROUP INFORMATION | FIRST GROUP INFORMATION | ECU(ID1)→ECU(ID2)→ECU(ID3) |
| | SECOND GROUP INFORMATION | ECU(ID4)→ECU(ID5)→ECU(ID6) |
| BUS LOAD TABLE | | REFER TO FIG. 5 |
| BATTERY LOAD | | 40% |
| VEHICLE CONDITION DURING REPROGRAMMING | | ALL PARKED/ALL TRAVELING/OPTIMAL |
| SCENE INFORMATION | | RECALL/DEALER/FACTORY/FUNCTION UPDATE NOTIFICATION/FORCED EXECUTION |
| ECU(IDn) INFORMATION n=1~6 | ECU_ID | ECU_ID |
| | REPROGRAMMING TYPE | SELF REPROGRAMMING/ANOTHER-ECU REPROGRAMMING |
| | CONNECTION BUS | FIRST BUS |
| | CONNECTION POWER SUPPLY | +B POWER, ACC POWER, IG POWER |
| | SECURITY ACCESS KEY INFORMATION | RANDOM NUMBER VALUE |
| | | KEY PATTERN |
| | | DECRYPTION OPERATION PATTERN |
| | MEMORY TYPE | SINGLE-BANK MEMORY/PSEUDO-DOUBLE-BANK MEMORY/DOUBLE-BANK MEMORY |
| | REPROGRAMMING METHOD | SELF-RETENTION POWER/POWER SUPPLY CONTROL |
| | SELF-RETENTION POWER TIME | 5 MINUTES |
| | REWRITE BANK INFORMATION | BANK-A IS START BANK AND BANK-B IS REWRITE BANK |
| | UPDATE SOFTWARE VERSION | 2.0 |
| | UPDATE SOFTWARE ACQUISITION ADDRESS | 1 |
| | UPDATE SOFTWARE SIZE | 10Mbyte |
| | ROLLBACK SOFTWARE VERSION | 1.0 |
| | ROLLBACK SOFTWARE ACQUISITION ADDRESS | 0x8000 |
| | ROLLBACK SOFTWARE SIZE | 10Mbyte |
| | UPDATE SOFTWARE DATA TYPE | DIFFERENCE DATA/ENTIRE DATA |
| | ROLLBACK SOFTWARE DATA TYPE | DIFFERENCE DATA/ENTIRE DATA |

FIG. 5

BUS LOAD TABLE

| | | FIRST BUS | SECOND BUS | THIRD BUS |
|---|---|---|---|---|
| ALLOWABLE TRANSMISSION AMOUNT | | 80% | 70% | 90% |
| IG POWER STATE | VEHICLE CONTROL DATA | 50% | 20% | 40% |
| | REPROGRAMMING DATA | 30% | 50% | 50% |
| ACC POWER SUPPLY STATE | VEHICLE CONTROL DATA | 30% | 30% | 20% |
| | REPROGRAMMING DATA | 50% | 40% | 70% |
| +B POWER SUPPLY STATE | VEHICLE CONTROL DATA | 20% | 10% | 50% |
| | REPROGRAMMING DATA | 60% | 60% | 40% |

FIG. 19

| EMBODIMENTS | STORAGE LOCATION OF REPROGRAMMING DATA | GENERATION LOCATION OF REWRITTEN SOFTWARE | DISPOSITION LOCATION OF OTA APPLICATION | REMARKS |
|---|---|---|---|---|
| FIRST EMBODIMENT | EXTERNAL STORAGE | FIRST ROM | FIRST RAM | |
| | EXTERNAL STORAGE | EXTERNAL STORAGE | FIRST RAM | |
| SECOND EMBODIMENT | EXTERNAL STORAGE | FIRST ROM | EXTERNAL STORAGE | IT IS ASSUMED THAT EXTERNAL STORAGE CAN EXECUTE OTA APPLICATION |
| | EXTERNAL STORAGE | EXTERNAL STORAGE | EXTERNAL STORAGE | |
| THIRD EMBODIMENT | EXTERNAL STORAGE | FIRST ROM | SECOND CORE | IT IS ASSUMED THAT REPROGRAMMING DATA CAN BE WRITTEN INTO FIRST ROM DURING ACTIVATION |
| | EXTERNAL STORAGE | EXTERNAL STORAGE | SECOND CORE | IT IS ASSUMED THAT REWRITTEN SOFTWARE CAN BE WRITTEN INTO FIRST ROM DURING OF ACTIVATION |
| FOURTH EMBODIMENT | EXTERNAL STORAGE | FIRST ROM | FIRST CORE, SECOND CORE | |

VEHICULAR ELECTRONIC CONTROL DEVICE, REWRITING PROGRAM, AND DATA STRUCTURE

CROSS REFERENCE TO RELATED APPLICATION

The present application is a continuation application of International Patent Application No. PCT/JP2022/013122 filed on Mar. 22, 2022, which designated the U.S. and claims the benefit of priority from Japanese Patent Application No. 2021-068430 filed on Apr. 14, 2021. The entire disclosures of all of the above applications are incorporated herein by reference.

TECHNICAL FIELD

The present disclosure relates to a vehicle electronic control device, a rewrite program, and a data structure.

BACKGROUND

A conceivable technique teaches a technique in which reprogramming data downloaded from a center device is distribution to an ECU and software of the ECU is rewritten through Over The Air (OTA).

SUMMARY

According to one example, a vehicle electronic control device may comprise: a microcomputer having a non-volatile memory that is capable of storing software, and a control unit that executes a rewrite program for rewriting the software; and an external storage provided outside the microcomputer and temporarily storing reprogramming data for updating the software. The control unit rewrites the software stored in the non-volatile memory by using a memory area of the external storage in a case where it is determined that own software is to be rewritten.

BRIEF DESCRIPTION OF DRAWINGS

The above object and other objects, features, and advantages of the present disclosure will become more apparent from the following detailed description with reference to the accompanying drawings. In the drawings:

FIG. 4 is a diagram illustrating specification data;

FIG. 5 is a diagram illustrating a bus load table;

FIG. 19 is a diagram describing details of each embodiment; and

DETAILED DESCRIPTION

Figure 1:
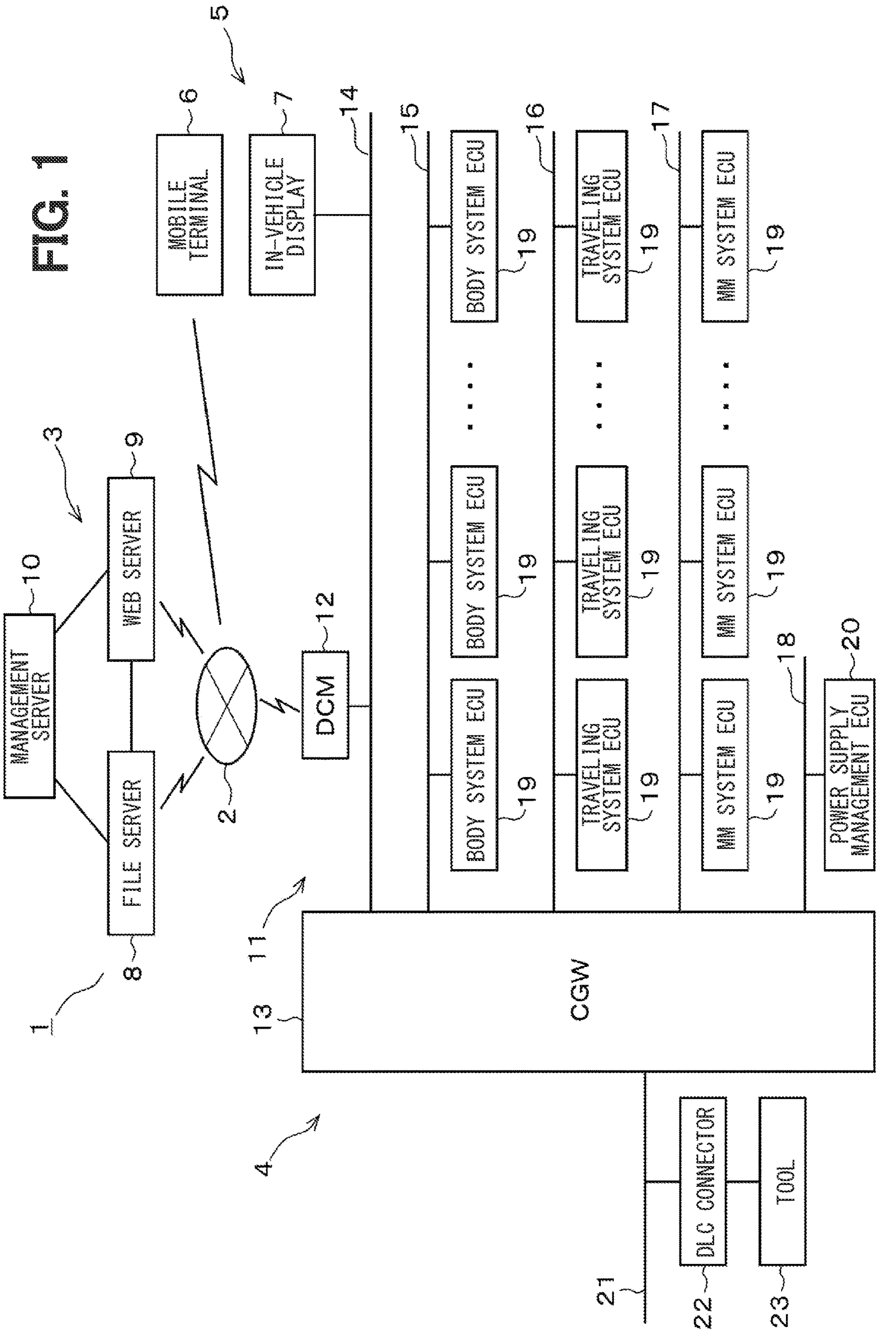
FIG. 1 is a diagram illustrating the overall configuration of a first embodiment.

The inventor of the present application has found the followings.

In recent years, a scale of software including programs and data for vehicle control, diagnosis, and the like, installed in an electronic control device (hereinafter, referred to as an electronic control unit (ECU)) of a vehicle, has been increased because of the diversification of vehicle control such as a driver-assistance function and an autonomous driving function. Along with version upgrade due to functional improvements, and the like, there are increasing opportunities to rewrite (reprogram) software necessary for an operation of the ECU. Meanwhile, a technique for connected cars has also been spread with the progress of communication networks or the like. Under these circumstances, a technique has been proposed in which a central gate way (CGW) that functions as a gateway ECU is provided on a vehicle side, in the CGW, reprogramming data downloaded from a center device is distribution to the ECU, and software of the ECU is rewritten through Over The Air (OTA).

The CGW executes a rewrite program for rewriting software, instructs the ECU to rewrite the software, and rewrites the software stored in a non-volatile memory of the ECU. As configurations of non-volatile memory, there are a single-bank memory having a single flash bank and a double-bank memory having double flash banks. A microcomputer having a double-bank memory (hereinafter referred to as a double-bank microcomputer) has advantages such as being capable of rewriting software during traveling of a vehicle, reducing the activation time required for switching active banks, and being capable of performing rollback to write back the software. On the other hand, in order to have these advantages, the entire memory area is always required to be separated into double banks. For example, in a case of a non-volatile memory with a capacity of 16 Mbytes, only 8 Mbytes can be used as a memory area for software, that is, only half the memory area can be used. In a double-bank microcomputer, when a microcomputer having a pseudo-single-bank memory is configured by arranging software in the entire memory area, it is possible to reduce the cost or increase a software capacity by reducing a memory capacity. However, there are disadvantages such as the inability to rewrite the software while the vehicle is traveling.

On the other hand, the CGW is also required to rewrite (self-reprogram) software necessary for own operations in accordance with version upgrade due to functional improvements such as higher functionality and higher speed. However, when a microcomputer installed in the CGW is a microcomputer having a single-bank memory (hereinafter referred to as a single-bank microcomputer), a rewrite program and software coexist in one memory area, and thus the software cannot be rewritten. Even when a microcomputer installed in the CGW is a double-bank microcomputer, when the microcomputer is configured as a pseudo-single-bank microcomputer as described above, the rewrite program and software coexist in one pseudo-memory area. Therefore, the software cannot be rewritten.

An object of the present disclosure is to appropriately rewrite own software even in a configuration in which a non-volatile memory that is a single-bank memory is installed, or a configuration in which a non-volatile memory that is an installed double-bank memory is used as a pseudo-single-bank memory.

According to one aspect of the present disclosure, a microcomputer has a non-volatile memory that is capable of storing software including a program and data and includes a first area and a second area as memory areas, and a control unit that includes a first core and a second core and executes a rewrite program for rewriting the software with at least one of the first core and the second core. An external storage is provided outside the microcomputer and temporarily stores reprogramming data for updating the software. The control unit rewrites the software stored in the non-volatile memory by using a memory area of the external storage in a case where it is determined, based on specification data, that own software is to be rewritten.

When own software is rewritten, the memory area where the rewrite program exists can be separated from the memory area where the software exists by using the memory area of the non-volatile memory and the memory area of the external storage provided outside the microcomputer as a pseudo-double-bank memory. The software can be rewritten by executing the rewrite program in a state in which the memory area where the rewrite program exists is separated from the memory area where the software exists. Accordingly, even in a configuration in which a non-volatile memory that is a single-bank memory is installed, or a configuration in which a non-volatile memory that is an installed double-bank memory is used as a pseudo-single-bank memory, own software can be properly rewritten.

Several embodiments will be described below with reference to the drawings. In each embodiment shown below, the same reference numerals are given to parts corresponding to the details described in the preceding embodiments, and redundant description may be omitted.

First Embodiment

A first embodiment will be described below with reference to FIGS. 1 to 13. A vehicle electronic control system is a system in which software for vehicle control and diagnosis installed in an electronic control device (hereinafter referred to as an electronic control unit (ECU)) can be rewritten through Over The Air (OTA). The software includes programs and data for realizing functions such as vehicle control and diagnosis, and can also be expressed as an application. In the present embodiment, a case of rewriting software for vehicle control, diagnosis, and the like will be described, but the present invention can also be applied to a case of rewriting a map application or map data used in the map application, for example.

As illustrated in FIG. 1, the vehicle electronic control system 1 has a center device 3 on a communication network 2 side, and a vehicle-side system 4 and a display terminal 5 on the vehicle side. The communication network 2 is includes, for example, a mobile object communication network such as a 4G line, the Internet, and Wireless Fidelity (Wi-Fi (registered trademark)).

The display terminal 5 is a terminal having a function of receiving an operation input from a user and a function of displaying various screens, and is, for example, a mobile terminal 6 such as a smartphone or a tablet computer that can be carried by a user, and an in-vehicle display 7 located in a vehicle compartment. The mobile terminal 6 can perform data communication with the center device 3 via the communication network 2 as long as the mobile terminal 6 is within a communication range of a mobile object communication network. The in-vehicle display 7 is connected to the vehicle-side system 4, and may also have a navigation function. The in-vehicle display 7 may be an in-vehicle display ECU having an ECU function, or may have a function of controlling display on a center display, a meter display, or the like.

A user can input operations and perform procedures related to software rewriting while checking various screens related to the software rewriting on the mobile terminal 6 as long as the user is located outside the vehicle compartment and within a communication range of the mobile object communication network. In the vehicle compartment, the user can input operations while checking various screens related to software rewriting on the in-vehicle display 7, and can perform procedures related to the software rewriting. In other words, the user can use the mobile terminal 6 and the in-vehicle display 7 separately outside the vehicle compartment and inside the vehicle compartment, and perform procedures related to software rewriting.

The center device 3 controls software update functions on the communication network 2 side in the vehicle electronic control system 1 and functions as an OTA center. The center device 3 includes a file server 8, a web server 9, and a management server 10, and the respective servers 8 to 10 are configured to be capable of performing data communication with each other. That is, the center device 3 includes multiple different servers for each function.

The file server 8 is a server that manages software files distributed from the center device 3 to the vehicle-side system 4. The file server 8 manages reprogramming data provided by a supplier or the like that is a provider of software distributed from the center device 3 to the vehicle-side system 4, specification data provided by an original equipment manufacturer (OEM), a vehicle condition acquired from the vehicle-side system 4, and the like. The file server 8 is capable of performing data communication with the vehicle-side system 4 via the communication network 2, and upon receiving a package data download request from the vehicle-side system 4, transmits download data including package data in which the reprogramming data and the specification data are packaged in one file, to the vehicle-side system 4. The download data includes a compressed file in a zip format. Upon receiving a download request from the vehicle-side system 4, the file server 8 may transmit the reprogramming data and the specification data to the vehicle-side system 4 as separate files.

The web server 9 is a server that manages web information. The web server 9 transmits web data managed thereby in response to a request from a web browser of the mobile terminal 6 or the like. The management server 10 is a server that manages personal information of users registered in a software rewriting service, a software rewriting history for each vehicle, and the like.

The vehicle-side system 4 has a vehicle master device 11. The vehicle master device 11 controls the software update function of the vehicle in the vehicle electronic control system 1 and functions as an OTA master. The vehicle master device 11 has a data communication module (DCM) 12 and a central gateway (CGW) 13. The DCM 12 performs data communication with the center device 3 via the communication network 2 through wireless communication.

The CGW 13 functions as a gateway ECU and corresponds to a vehicle electronic control device. The DCM 12 and the CGW 13 are connected to each other via a first bus 14 to be capable of performing data communication. Although FIG. 1 illustrates a configuration in which the DCM 12 and the in-vehicle display 7 are connected to the same first bus 14, the DCM 12 and the in-vehicle display 7 may be connected to separate buses. The CGW 13 may have some or all of the functions of the DCM 12, or the DCM 12 may have some or all of the functions of the CGW 13. In other words, in the vehicle master device 11, the DCM 12 and the CGW 13 may share functions in any way. The vehicle master device 11 may include two ECUs such as the DCM 12 and the CGW 13, or may include one integrated ECU having the functions of the DCM 12 and the CGW 13.

In addition to the first bus 14, a second bus 15, a third bus 16, a fourth bus 17, and a fifth bus 18 are connected to the CGW 13 as buses inside the vehicle, and various ECUs 19 are connected via the buses 15 to 17, and a power supply management ECU 20 is connected via the bus 18.

The second bus 15 is, for example, a body system network bus. The ECUs 19 connected to the second bus 15 are ECUs controlling a body system. The ECUs controlling the body system include, for example, a door ECU controlling locking/unlocking of a door, a meter ECU controlling display on the meter display, an air conditioner ECU controlling driving of an air conditioner, a window ECU controlling opening and closing of a window, and a security ECU driven to prevent theft of the vehicle.

The third bus 16 is, for example, a traveling system network bus. The ECUs 19 connected to the third bus 16 are ECUs controlling a traveling system. The ECUs controlling the traveling system include, for example, an engine ECU controlling driving of an engine, a brake ECU controlling driving of a brake, an electronic controlled transmission (ECT) ECU controlling driving of an automatic transmission, and a power steering ECU controlling a driving of a power steering.

The fourth bus 17 is, for example, a multimedia system network bus. The ECUs 19 connected to the fourth bus 17 are ECUs controlling a multimedia system. The ECUs controlling the multimedia system include, for example, a navigation ECU controlling a navigation system, and an ETC ECU controlling an electronic toll collection system (ETC) (registered trademark). The buses 15 to 17 may be system buses other than the body system network bus, the traveling system network bus, and the multimedia system network bus. The number of buses and the number of the ECUs 19 are not limited to the exemplified configuration.

The power supply management ECU 20 is an ECU that manages power to be supplied to the DCM 12, the CGW 13, the various ECUs 19, and the like.

A sixth bus 21 is connected to the CGW 13 as a bus outside of the vehicle. A data link coupler (DLC) connector 22 to which a tool 23 functioning as a service tool is detachably connected is connected to the sixth bus 21. The buses 14 to 18 inside the vehicle and the bus 21 outside the vehicle are configured with, for example, Controller Area Network (CAN) (registered trademark) buses, and the CGW 13 performs data communication with the DCM 12, the various ECUs 19, and the tool 23 in accordance with the CAN data communication standard and the diagnosis communication standard (Unified Diagnosis Services (UDS): ISO14229). The DCM 12 and the CGW 13 may be connected to each other via Ethernet, and the DLC connector 22 and the CGW 13 may be connected to each other via Ethernet.

After downloading download data from the file server 8, the DCM 12 transmits the downloaded download data to the CGW 13. Upon receiving the download data from the DCM 12, the CGW 13 decompresses the received download data to acquire package data, and acquires reprogramming data and specification data from the acquired package data.

When a software rewrite target is the ECU 19, the CGW 13 instructs the ECU 19 that is a software rewrite target to install the acquired reprogramming data on the condition that conditions that an instruction for installation for writing the reprogramming data can be given are established. The conditions that the instruction for installation can be given are that an approval for installation is obtained, the CGW 13 is capable of performing data communication with the center device 3 via the DCM 12, the vehicle is in a state in which installation is possible, the ECU 19 that is a rewrite target is in an installable state, the reprogramming data is normal data, and the like. When the ECU 19 that is a rewrite target is instructed to install the reprogramming data from the CGW 13, the ECU 19 installs the reprogramming data.

When the installation of the reprogramming data is completed in the ECU 19 that is a rewrite target, the CGW 13 instructs the ECU 19 that is a rewrite target to perform activation on the condition that conditions for enabling an instruction to activate the software after the completion of installation are established. The conditions that an instruction for activation can be given are that an approval for activation has been obtained, a vehicle condition is a state in which activation is possible, the ECU 19 that is a rewrite target is in a state in which activation is possible, and the like. When the ECU 19 that is a rewrite target is instructed to execute activation from the CGW 13, the ECU 19 executes activation.

Figure 2:
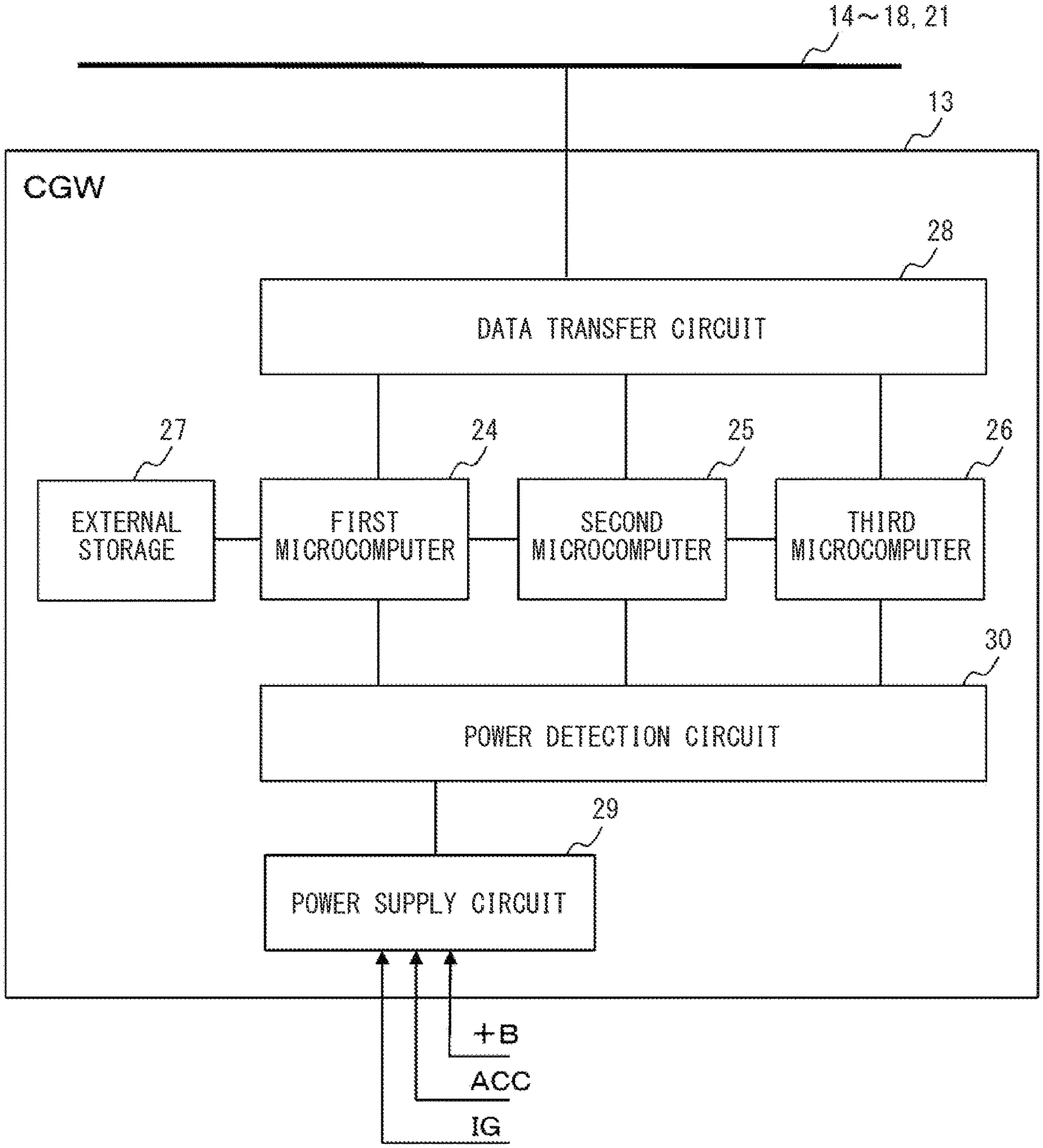
FIG. 2 is a functional block diagram of a CGW.

As illustrated in FIG. 2, the CGW 13 includes, as electrical functional blocks, three microcomputers (hereinafter referred to as microcomputers) 24 to 26, an external storage 27, a data transfer circuit 28, a power supply circuit 29, and a power detection circuit 30. The three microcomputers 24 to 26 may be mounted on the same board or may be mounted on different boards. The first microcomputer 24 and the second microcomputer 25 are connected to each other to be capable of performing data communication, and the second microcomputer 25 and the third microcomputer 26 are connected to each other to be capable of performing data communication. The microcomputers 24 to 26 have different specifications and cooperate with each other to realize the operation of the CGW 13. The microcomputers 24 to 26 each execute various control programs stored in non-transitory tangible storage media, perform various processes, and cooperate to control the operation of the CGW 13. In the present embodiment, the configuration in which three microcomputers 24 to 26 are installed in the CGW 13 is exemplified, but the specifications, number, and combination of microcomputers installed in the CGW 13 are determined according to the processing capacity required for the CGW 13. That is, in a case where the CGW 13 is required to have relatively high processing capacity, a microcomputer with relatively high specifications is employed, or multiple microcomputers are employed to realize distributed processing or parallel processing.

The external storage 27 is provided separately from the microcomputers 24 to 26, is directly connected to the first microcomputer 24 via a dedicated line, and is connected to the first microcomputer 24 to be capable of performing data communication, is indirectly connected to the second microcomputer 25 and the third microcomputer 26 via the first microcomputer 24, and is connected to the second microcomputer 25 and the third microcomputer 26 via the first microcomputer 24 to be capable of performing data communication. The external storage 27 is, for example, an embedded Multi Media Card (eMMC) or a NorFlash, and corresponds to an external storage. The external storage 27 has a sufficient memory capacity to store download data including package data distributed from the center device 3. The external storage 27 has, for example, a capacity of several GB, specifically a capacity of 1 GB, 4 GB, or 8 GB. The external storage 27 can store both download data for rewriting the software of the ECU 19 and download data for rewriting the software of the CGW 13. The external storage 27 may store vehicle log data collected by a vehicle-mounted sensor, or may store image data captured by an on-board camera.

The data transfer circuit 28 controls data communication with the buses 14 to 18 and 21 conforming to CAN data communication standards and diagnosis communication standards. The power supply circuit 29 inputs a battery power, an accessory power supply, and an ignition power supply. The power detection circuit 30 detects a voltage value of the +B power, a voltage value of the ACC power, and a voltage value of the IG power input by the power supply circuit 29, compares these detected voltage values with a predetermined voltage threshold value, and outputs the comparison results to the microcomputers 24 to 26. The microcomputers 24 to 26 determine whether the +B power, the ACC power, and the IG power externally supplied to the CGW 13 are normal or abnormal based on the comparison results input from the power detection circuit 30.

Figure 3:
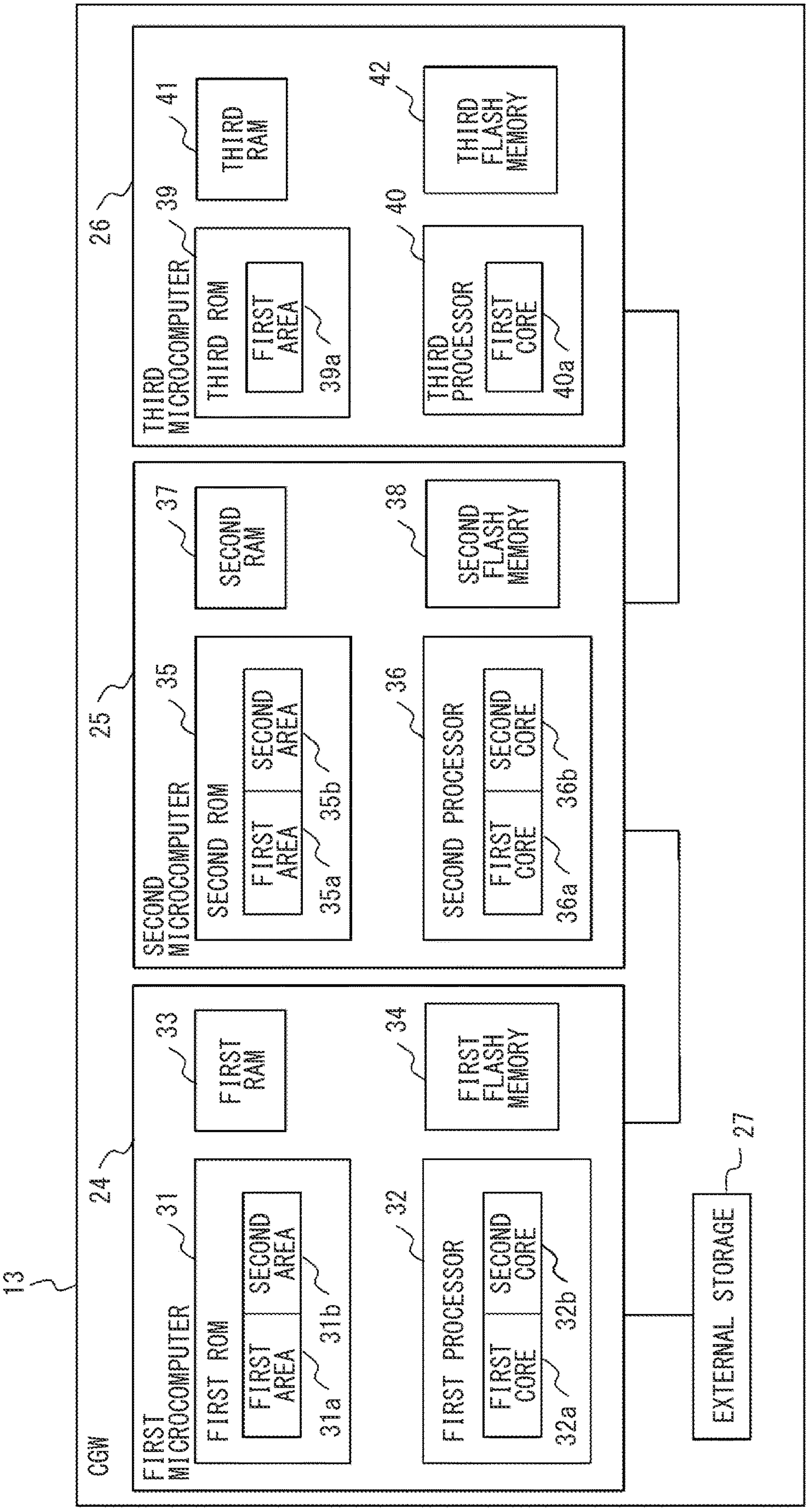
FIG. 3 is a functional block diagram of a microcomputer.

As illustrated in FIG. 3, the first microcomputer 24 has a first ROM 31, a first processor 32, a first RAM 33, and a first flash memory 34. The first ROM 31 has a configuration of a double-bank memory having double flash banks, and includes a first area 31*a* and a second area 31*b* as memory areas. The first processor 32 has a multi-core configuration and includes a first core 32*a* and a second core 32*b*. The first microcomputer 24 is a double-bank microcomputer having the first ROM 31 that is a double-bank memory.

The second microcomputer 25 has a second ROM 35, a second processor 36, a second RAM 37, and a second flash memory 38. The second ROM has a configuration of a double-bank memory having double flash banks, and includes a first area 35*a* and a second area 35*b* as memory areas. The second processor 36 has a multi-core configuration and includes a first core 36*a* and a second core 36*b*. Similar to the first microcomputer 24, the second microcomputer is also a double-bank microcomputer having a second ROM 35 that is a double-bank memory.

The third microcomputer 26 has a third ROM 39, a third processor 40, a third RAM 41, and a third flash memory 42. The third ROM 39 has a single-bank memory configuration having a single flash bank, and includes a first area 39*a* as a memory area. The third processor 40 has a single-core configuration and includes a first core 40*a*. Unlike the first microcomputer 24 and the second microcomputer 25, the third microcomputer 26 is a single-bank microcomputer having the third ROM 39 that is a single-bank memory.

In addition to rewriting the software of the ECU 19 that is a rewrite target as described above, the CGW 13 is required to rewrite (self-reprogram) software necessary for own operations in accordance with the version upgrade due to functional improvements such as higher functionality and higher speed. The CGW 13 determines whether a rewrite target is the self or another ECU 19 based on the specification data provided by the OEM.

As illustrated in FIG. 4, the specification data provided from the OEM to the CGW 13 includes group information, a bus load table, a battery load, a vehicle condition during reprogramming, scene information, and ECU information. The group information is information indicating a group to which the ECU 19 belongs and a rewrite order, and defines the software is rewritten in the order of an ECU (ID1), an ECU (ID2), and an ECU (ID3) as first group information and defines the software is rewritten in the order of an ECU (ID4), an ECU (ID5), and an ECU (ID6) as second group information. As illustrated in FIG. 5, the bus load table is a table illustrating a correspondence relationship between a power supply state and an allowable transmission amount of the bus, and defines a transmission amount of vehicle control data and reprogramming data that are transmittable with respect to the maximum allowable transmission amount for each bus.

The battery load is information indicating a lower limit value of an allowable remaining battery charge of the vehicle battery in the vehicle, and defines a numerical value indicating a ratio. The vehicle condition during reprogramming is information indicating in what state rewriting is to be performed, and defines any one of “all parked”, “all traveling”, and “optimal”. The scene information is information indicating a reprogramming scene, and defines any of recall, dealer, factory, function update notification, and forced execution.

The ECU information is information regarding the ECU 19, and includes ECU_ID, a reprogramming type, a connection bus, a connection power supply, security access key information, a memory type, a reprogramming method, self-retention power time, rewrite bank information, an update software version, an update software acquisition address, an update software size, a rollback software version, a rollback software acquisition address, a rollback software size, an update software data type, and a rollback software data type.

The reprogramming type is information indicating a rewrite target, and defines either self-reprogramming or another-ECU reprogramming. That is, the CGW 13 determines that a rewrite target is the CGW 13 when the reprogramming type is “self reprogramming”, and determines that a rewrite target is another ECU 19 when the reprogramming type is “another-ECU reprogramming”. That is, the specification data has a data structure including information that can specify whether the software stored in the CGW 13 is rewritten or the software stored in the ECU 19 is rewritten. Note that the CGW 13 may determine “self reprogramming” or “another-ECU reprogramming” based on the information of ECU_ID instead of the reprogramming type. That is, in a case where an ECU_ID corresponding to the CGW 13 is designated as the ECU_ID, the CGW 13 may determine that a rewrite target is the self, and in a case where an ECU_ID other than the ECU_ID corresponding to the CGW 13 is designated as the ECU_ID, determine that a rewrite target is another ECU 19.

The connection bus indicates a bus to which a rewrite target is connected. The connection power supply indicates a power supply line to which a rewrite target is connected. The security access key information indicates key information used for authentication for the CGW 13 to access the ECU 19 when the reprogramming type is “another-ECU reprogramming”, and includes random number values or unique information, key patterns, and decryption operation patterns. The memory type indicates whether a memory installed in a rewrite target is a single-bank memory, a pseudo-double-bank memory, or a double-bank memory. The reprogramming method indicates whether rewriting is performed based on self-retention power or based on power supply control. The self-retention power time indicates the time during which the self-retention power is continued when the reprogramming method is rewriting based on the self-retention power. The rewrite bank information indicates which bank is an active bank and which bank is an inactive bank. The active bank is also referred to as a start bank, and the inactive bank is also referred to as a rewrite bank.

The update software version indicates a version of update software. The update software acquisition address indicates an address of the update software. The update software size indicates a data size of the update software. The rollback software version indicates a version of rollback software. The rollback software acquisition address indicates an address of the rollback software. The rollback software size indicates a data size of the rollback software. The update software data type indicates whether update reprogramming data is difference data or entire data. The rollback software data type indicates whether rollback reprogramming data is difference data or entire data. In addition to the above information, the specification data may include information uniquely defined by the system.

Figure 6:
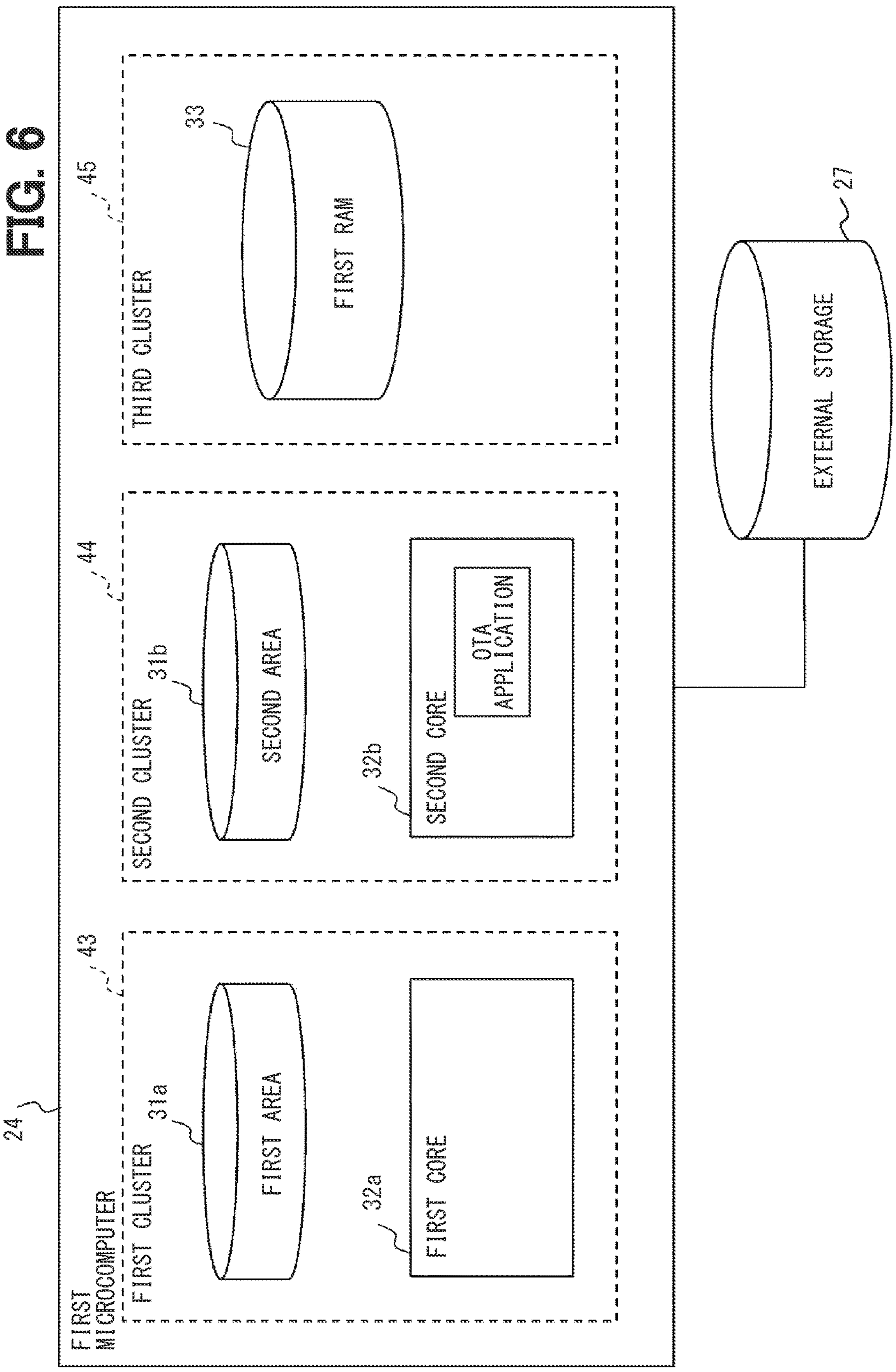
FIG. 6 is a diagram illustrating clusters inside the microcomputer.
Figure 7:
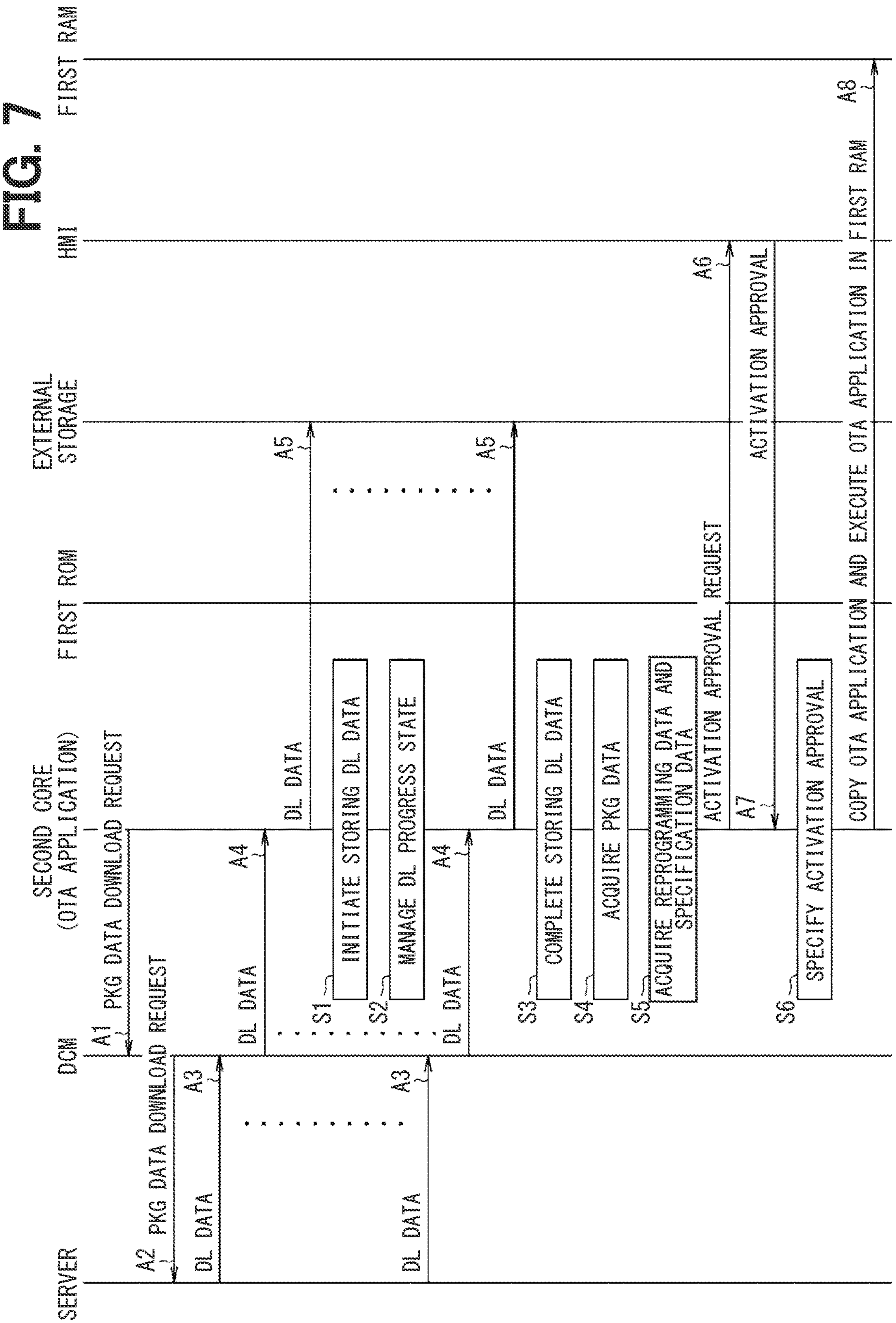
FIG. 7 is a diagram illustrating a processing flow.
Figure 8:
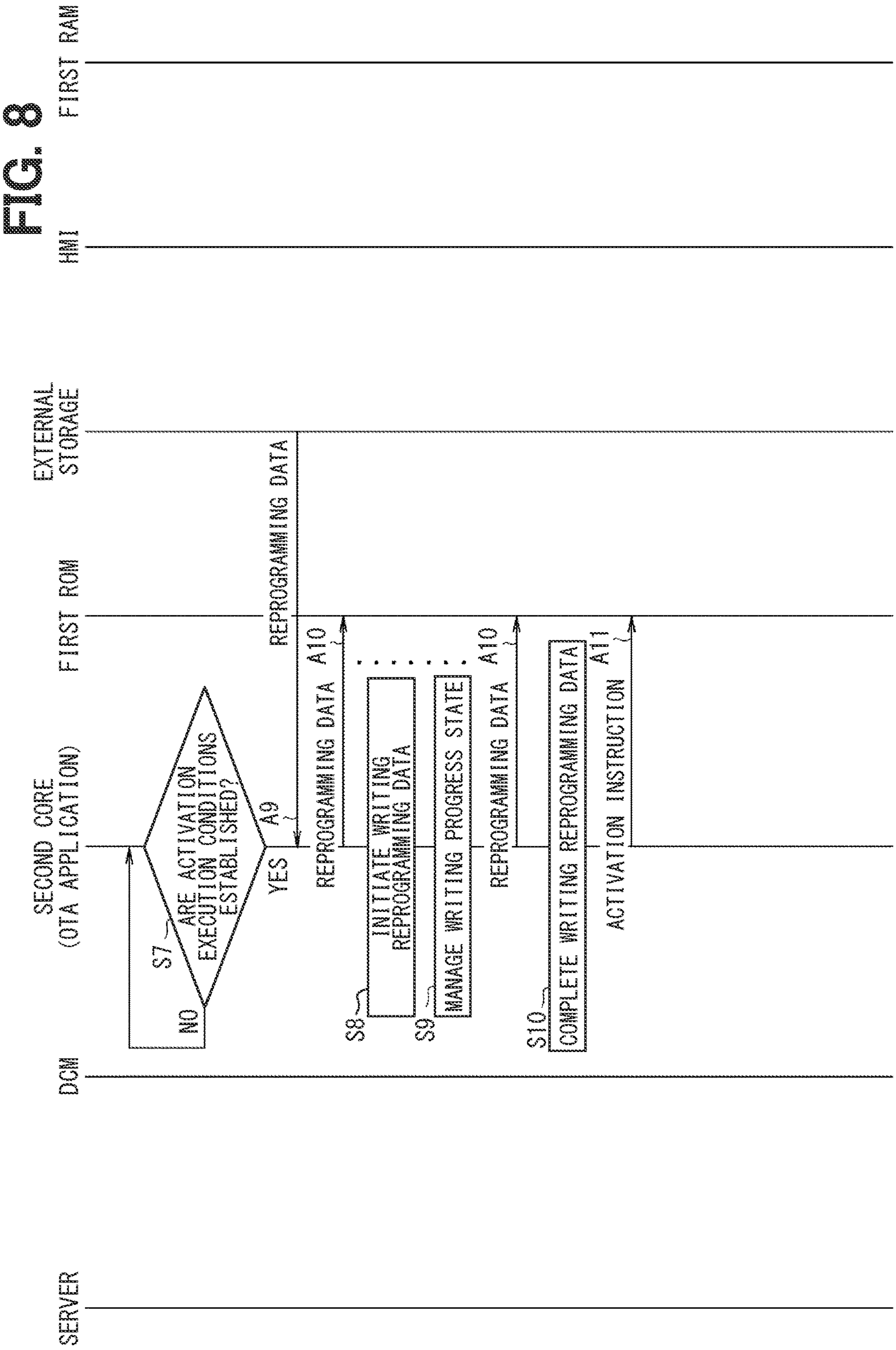
FIG. 8 is a diagram illustrating a processing flow.
Figure 9:
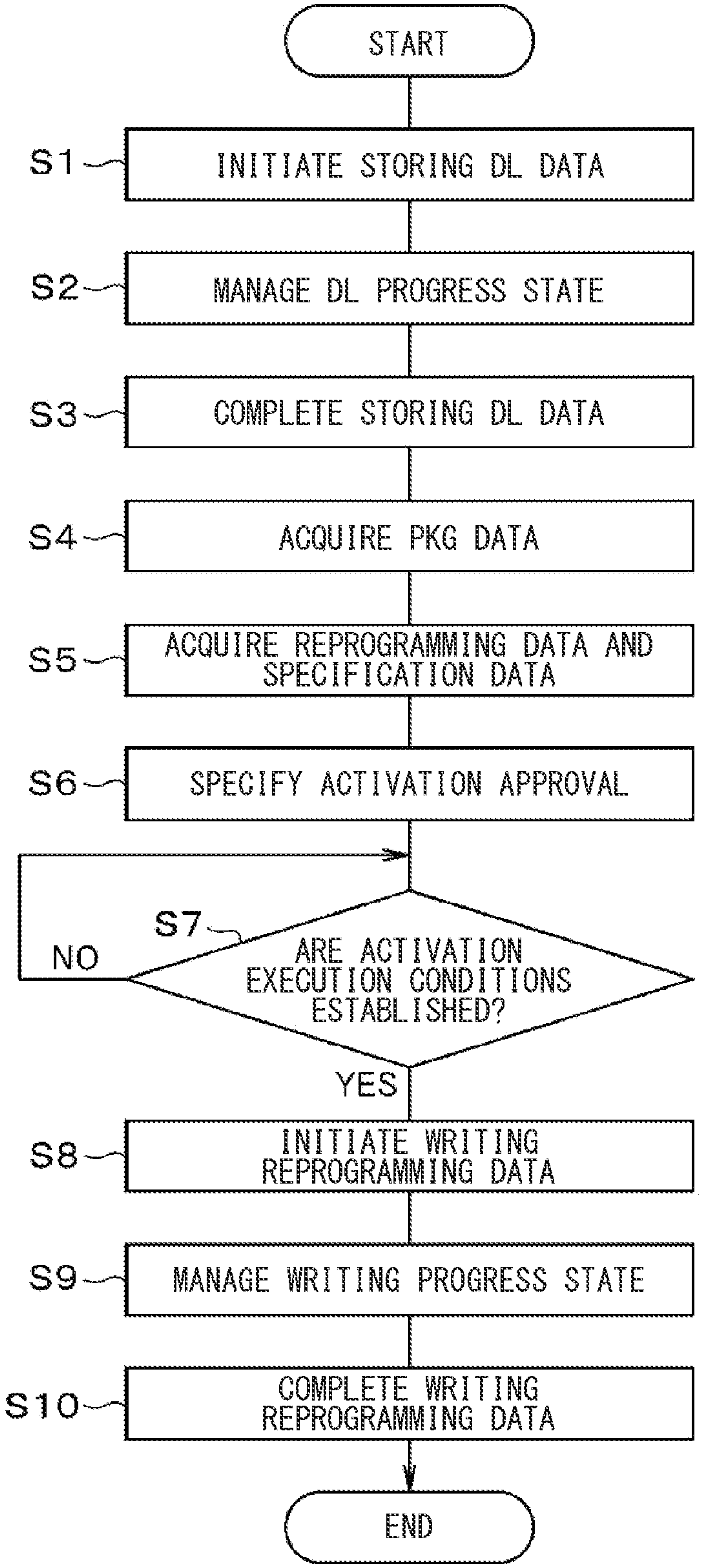
FIG. 9 is a flowchart.

A case where the reprogramming type of the specification data is "self-reprogramming" and the CGW 13 rewrites the own software will be described below. Here, a case of rewriting the software stored in the first ROM 31 of the first microcomputer 24 will be described. As illustrated in FIG. 6, in the first microcomputer 24, a first cluster 43 includes the first area 31*a* of the first ROM 31 and the first core 32*a* of the first processor 32. A second cluster 44 includes the second area 31*b* of the first ROM 31 and the second core 32*b* of the first processor 32. A third cluster 45 includes the first RAM 33. The first processor 32 corresponds to a control unit. The first RAM 33 corresponds to an internal storage.

An OTA application, which is a rewrite program for rewriting software, is stored in the second area 31*b*. When it is determined that the reprogramming type is "another-ECU reprogramming" and that the rewrite target is another ECU 19, the second core 32*b* reads the OTA application from the second area 31*b* and executes it to rewrite the software. The ECU 19 is instructed to rewrite the software stored in the ROM of the ECU 19 that is a rewrite target.

As described above, the first ROM 31 has a double-bank memory configuration having the first area 31*a* and the second area 31*b* as memory areas. When the first microcomputer 24 is configured as a pseudo-single-bank microcomputer by disposing software in the entire memory area, a capacity of the software can be increased, but there are disadvantages such as the inability to rewrite the software while the vehicle is traveling. Therefore, in order to make the software rewritable while the vehicle is traveling, it is necessary that the first microcomputer 24 is operated as a pseudo-single-bank microcomputer during normal times other than self-reprogramming, and the first microcomputer 24 is operated as a double-bank microcomputer during self-reprogramming.

Under these circumstances, when the second core 32*b* determines that the reprogramming type is "self-reprogramming" and the rewrite target is the self, the second core 32*b* reads the OTA application from the second area 31*b* and performs processes described below. At the time of self-reprogramming, the memory area of the first ROM 31 and the memory area of the external storage 27 are operated as a pseudo-double-bank memory. In this case, there are a pattern in which the rewritten software is generated in the first ROM 31 and a pattern in which the rewritten software is generated in the external storage 27. The rewritten software may be referred to as a software after rewriting, a software after update, an updated software.

(1) Pattern in which Rewritten Software is Generated in the First ROM 31

The pattern in which rewritten software is generated in the first ROM 31 will be described with reference to FIGS. 7 to 10.

When the second core 32*b* specifies the presence of campaign information that defines software rewriting, and specifies that a user has approved downloading of download data, the second core 32*b* causes the CGW 13 to transmit a download request for the package data to the DCM 12 (A1). Upon receiving the download request for package data from the second core 32*b*, the DCM 12 transmits the received download request for package data to the center device 3, which is a server (A2). Upon receiving the download request from the DCM 12, the center device 3 generates download data including the package data that is a download target, and initiates transmitting the generated download data to the DCM 12 (A3). Upon receiving the download data from the center device 3, the DCM 12 initiates transmitting the received download data to the CGW 13 (A4).

When it is determined that the download data is received from the DCM 12 to the CGW 13, the second core 32*b* initiates transferring the download data to the external storage 27 (A5), and initiates storing the download data into the external storage 27 (S1). The second core 32*b* manages the progress state of the download (S2), and upon completion of storing the download data into the external storage 27 (S3), decompresses the download data to acquires package data (S4), and acquires reprogramming data and specification data from the acquired package data (S5).

When the second core 32*b* reads the specification data, and when it is determined that the reprogramming type is "self-reprogramming", transmits an activation approval request to the HMI (A6, corresponding to a first procedure). In this case, the activation approval request also serves as an installation approval request. The HMI is the mobile terminal 6 or the in-vehicle display 7, and when it is specified that the user has operated the mobile terminal 6 or the in-vehicle display 7 to approve activation, transmits the activation approval to the OTA application (A7). In this case, the activation approval also serves as an installation approval.

Upon receiving the activation approval from the HMI, the second core 32*b* specifies the activation approval (S6), copies the OTA application to the first RAM 33, and executes the OTA application in the first RAM 33 (A8). The second core 32*b* waits until activation execution conditions are established (S7), and when it is determined that the activation execution conditions are established (S7: YES), reads reprogramming data from the external storage 27 (A9). The second core 32*b* initiates transferring the read reprogramming data to the first area 31*a* and the second area 31*b* of the first ROM 31 (A10) and initiates writing the reprogramming data into the first area 31*a* and the second area 31*b* of the first ROM 31 (S8). That is, the second core 32*b* initiates an installation process. The OTA application generates rewritten software in the first area 31*a* and the second area 31*b* of the first ROM 31.

The second core 32*b* manages the progress state of writing (S9), outputs an activation instruction to the first ROM 31 when the writing of the reprogramming data to the first area 31*a* and the second area 31*b* of the first ROM 31 is completed (S10), and rewrites the software stored in the first ROM 31 (A11, corresponding to a second procedure). In the above-described process, the OTA application stored in the second area 31*b* of the first ROM 31 is executed by the second core 32*b* to execute A1 to A7, and the OTA application is copied to the first RAM 33 and executed to execute A8 to A11 in the first RAM 33. The OTA application executed in the first RAM 33 acquires the address of the external storage 27 to execute data transfer of the reprogramming data.

Figure 10:
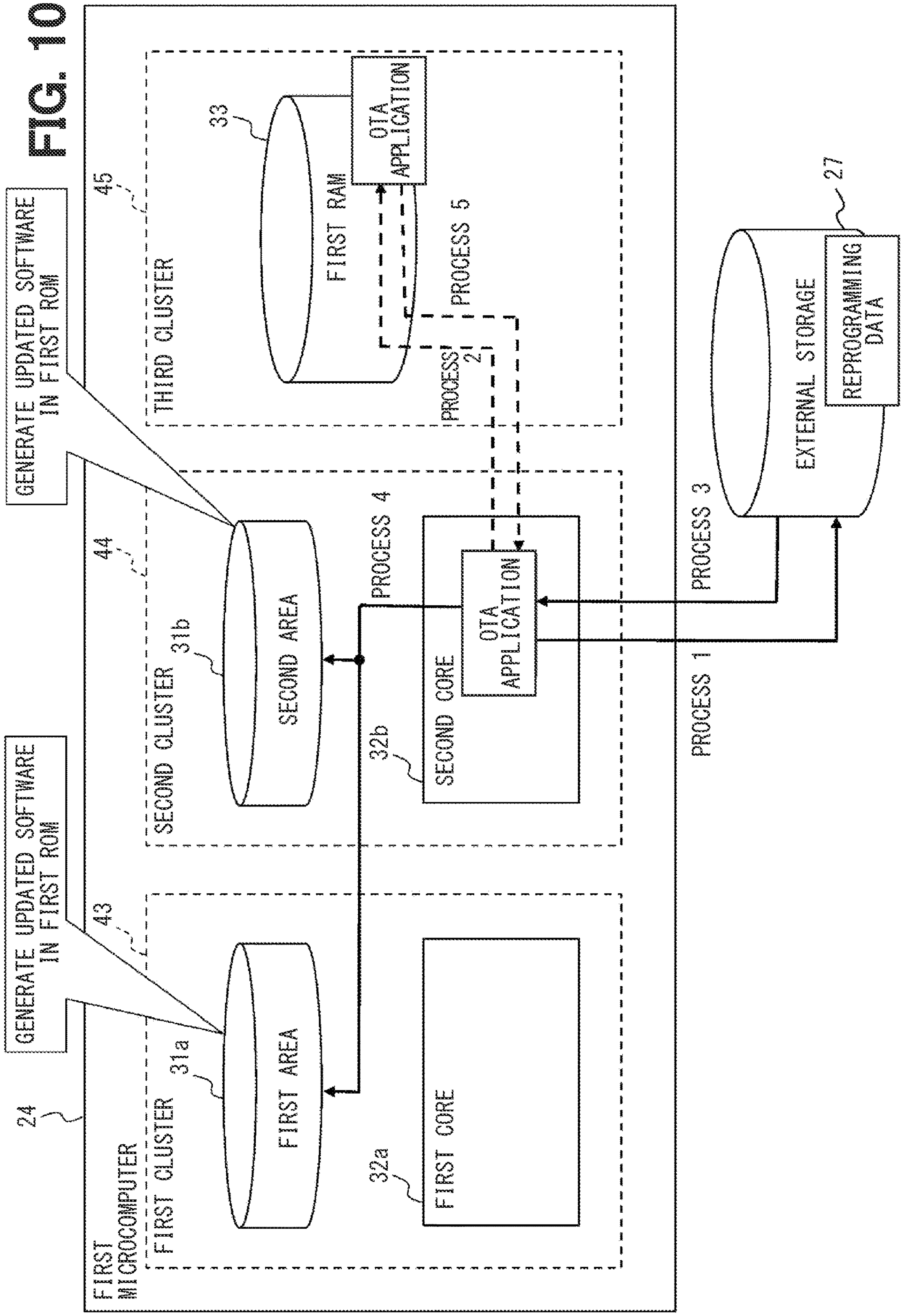
FIG. 10 is a diagram for describing the order of processes.

FIG. 10 illustrates the order of processes in the pattern in which rewritten software is generated in the first ROM 31. Process 1 to process 4 are as follows.

Process 1: The download data is stored in the external storage 27.

Process 2: The OTA application is copied to the first RAM 33 and executed in the first RAM 33. That is, the OTA application is executed in the RAM (referred to as RAM execution).

Process 3: When the activation execution conditions are established, the reprogramming data is read from the external storage 27.

Process 4: The reprogramming data is written into the first ROM 31 and rewritten software is generated in the first ROM 31.

Process 5: The OTA application is executed by the second core 32*b* (restored).

(2) Pattern in which Rewritten Software is Generated in External Storage 27

Figure 11:
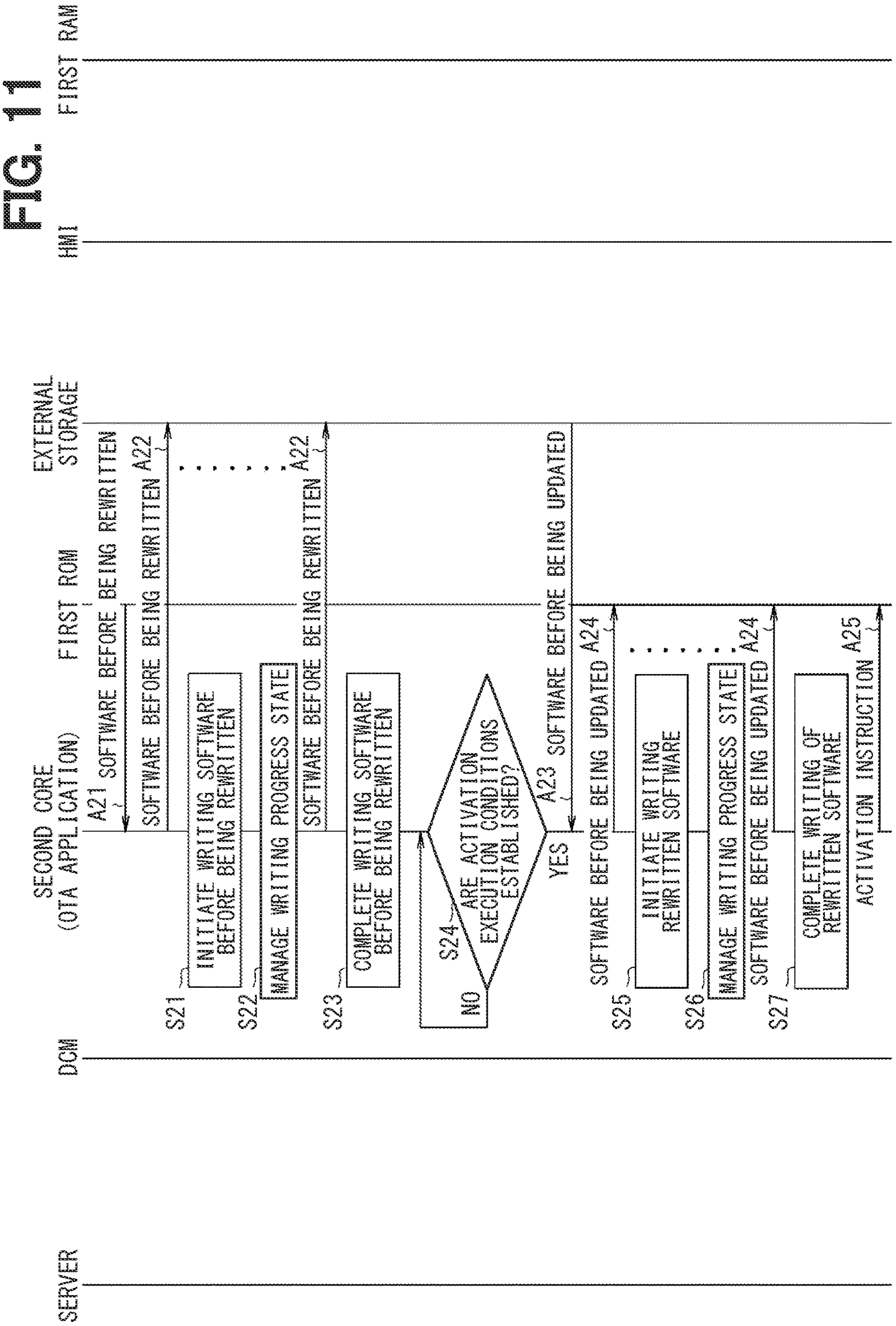
FIG. 11 is a diagram for describing the order of processes.
Figure 12:
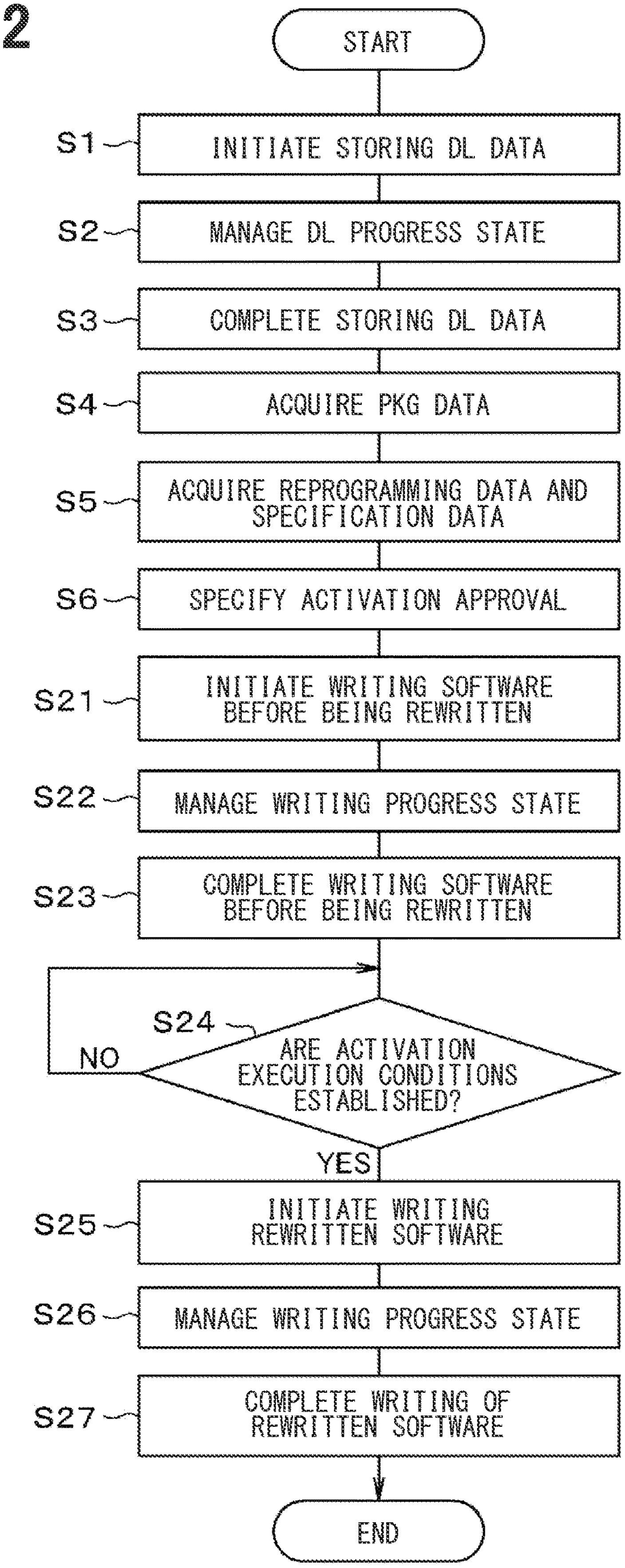
FIG. 12 is a flowchart.

The pattern in which rewritten software is generated in the external storage 27 will be described with reference to FIGS. 11 to 13.

Upon receiving the activation approval from the HMI, the second core 32*b* specifies the activation approval (S6), copies the OTA application to the first RAM 33, and executes the OTA application in the first RAM 33 (A8). The second core 32*b* reads the software before being rewritten from the first ROM 31 (A21), initiates transferring the read software before being rewritten to the external storage 27 (A22), and initiates writing the reprogramming data of the software before being rewritten into the external storage 27 (S21).

The second core 32*b* manages the progress state of the writing (S22), and when the writing of the software before being rewritten to the external storage 27 is completed (S23), waits until the activation execution conditions are established (S24). When it is determined that the activation execution conditions are established (S24: YES), the second core 32*b* reads the rewritten software from the external storage 27 (A23), initiates transferring the read rewritten software to the first ROM 31 (A24), and initiates writing the rewritten software into the first ROM 31 (S25).

The second core 32*b* manages the progress state of writing (S26), and when the writing of the rewritten software to the first ROM 31 is completed (S27), outputs an activation instruction to the first ROM 31, and rewrites the software stored in the first ROM 31 (A25, corresponding to the second procedure).

Figure 13:
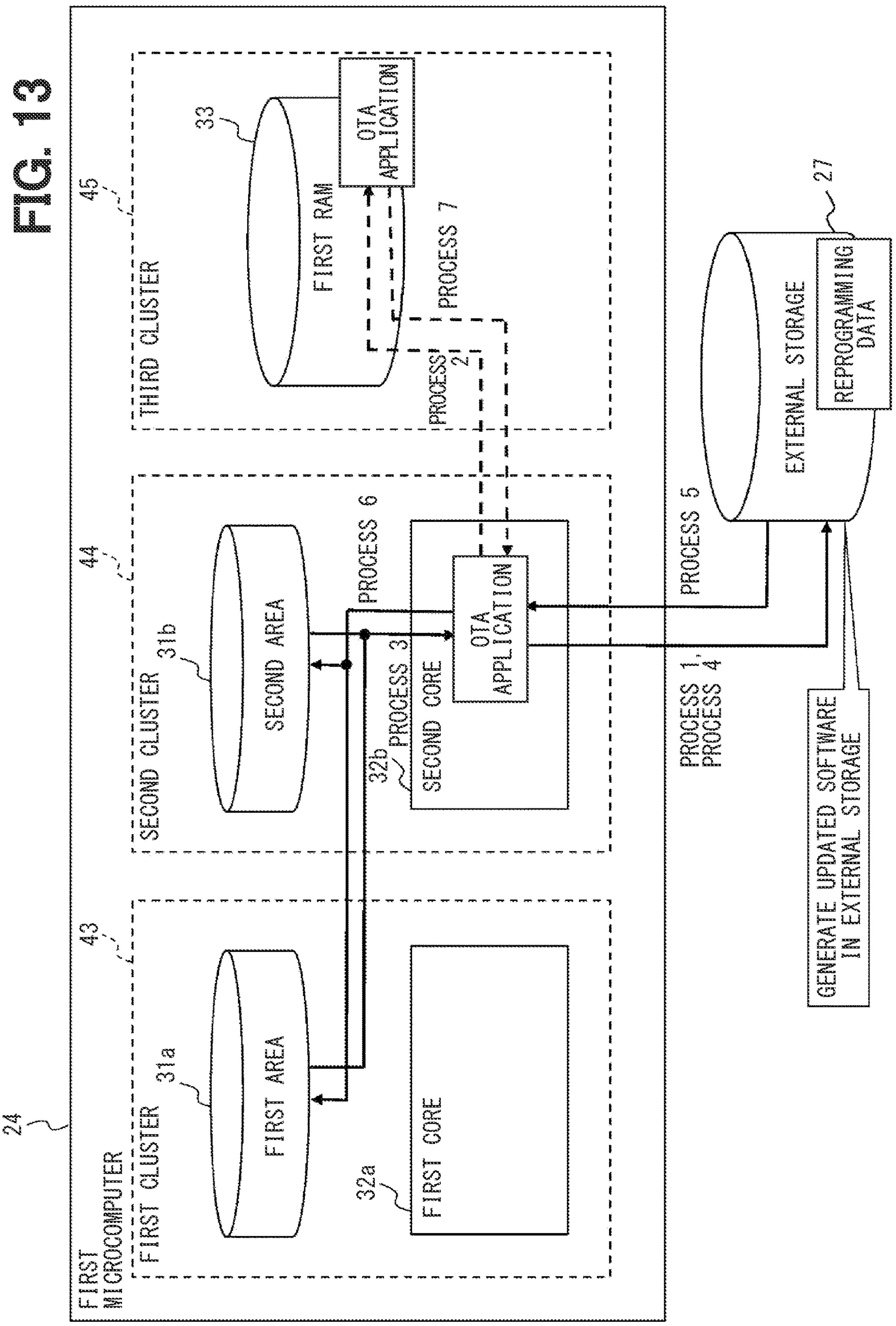
FIG. 13 is a diagram for describing the order of processes.

FIG. 13 illustrates the order of processes in the pattern in which rewritten software is generated in the external storage 27. Process 1 to process 6 are as follows.

Process 1: The download data is stored in the external storage 27.

Process 2: The OTA application is copied to the first RAM 33 and executed in the first RAM 33. That is, the OTA application is executed in the RAM.

Process 3: The software before being rewritten is read from the first ROM 31.

Process 4: The software before being rewritten is written into the external storage 27 and rewritten software is generated in the external storage 27.

Process 5: When the activation execution conditions are established, the rewritten software is read from the external storage 27.

Process 6: The rewritten software is written into the first ROM 31.

Process 7: The OTA application is executed by the second core 32*b* (restored).

In the CGW 13, the external storage 27 storing the download data is used, and the external storage 27 is temporarily used as an inactive bank, so that, with respect to the first ROM 31 having double flash banks, the memory area of the first ROM 31 and the memory area of the external storage 27 can be operated as a pseudo-double-bank memory during self-reprogramming. Therefore, by operating the first ROM 31 as a pseudo-single-bank memory during normal times other than self-reprogramming, it is possible to reduce the cost and increase a capacity of software by reducing a memory capacity. During self-reprogramming, the memory area of the first ROM 31 and the memory area of the external storage 27 are operated as a pseudo-double-bank memory, and thus it is possible to achieve advantages such as being capable of rewriting software during traveling of a vehicle, reducing the activation time required for switching active banks, and being capable of performing rollback to write back the software.

In the above description, the case where the first processor 32 rewrites the software stored in the first ROM 31 inside the first microcomputer 24 has been described, but it may also be possible for the first processor 32 of the first microcomputer 24 to rewrite software stored in a ROM of another microcomputer in cooperation between the first microcomputer 24 and the other microcomputer. For example, the first microcomputer 24 may cooperate with the second microcomputer 25, and thus the first processor 32 of the first microcomputer 24 may rewrite the software stored in the second ROM 35 of the second microcomputer 25. In this case, similar to the first ROM 31, the memory area of the second ROM 35 and the memory area of the external storage 27 may be operated as a pseudo-double-bank memory during self-reprogramming for the second ROM 35 that has double flash banks. In a case where there are multiple microcomputers that can be self-reprogramming targets as those in the present embodiment, information that can specify a microcomputer that is a self-reprogramming target is stored in the reprogramming type of the above specification data.

That is, in the second microcomputer 25, similarly to the first microcomputer 24, the second ROM 35 is operated as a pseudo-single-bank memory during normal times other than self-reprogramming, and thus it is possible to reduce the cost by reducing a memory capacity and increase a capacity of the software. During self-reprogramming, the memory area of the second ROM 35 and the memory area of the external storage 27 are operated as a pseudo-double-bank memory, and thus it is possible to achieve advantages such as being capable of rewriting software during traveling of a vehicle, reducing the activation time required for switching active banks, and being capable of performing rollback to write back the software.

The first microcomputer 24 may cooperate with the third microcomputer 26, and thus the first processor 32 of the first microcomputer 24 may rewrite the software stored in the third ROM 39 of the third microcomputer 26. The second processor 36 of the second microcomputer 25 may rewrite the software stored in the first ROM 31 of the first microcomputer 24 or the third ROM 39 of the third microcomputer 26. The third processor 40 of the third microcomputer 26 may rewrite the software stored in the first ROM 31 of the first microcomputer 24 or the second ROM 35 of the second microcomputer 25.

As described above, according to the first embodiment, the following operational effects can be achieved.

In the CGW 13, the external storage 27 storing download data is used, and in a case where self-reprogramming of the first microcomputer 24 is performed, the memory area of the first ROM 31 and the memory area of the external storage 27 are used as a pseudo-double-bank memory. Therefore, it is possible to rewrite the software by executing the OTA application in a state in which the memory area where the OTA application exists is separated from the memory area where the software exists. Accordingly, even in a configuration in which the first ROM 24 that is a double-bank memory is used as a pseudo-single-bank memory, it is possible to appropriately rewrite own software.

The OTA application is copied to the first RAM 33 and executed in the first RAM 33. This can be realized without requiring that the external storage 27 can execute the OTA application, and that reprogramming data or rewritten software stored in the external storage 27 can be written into the first ROM 31 at the time of activation. That is, in a configuration in which the external storage 27 can execute an OTA application, or in a configuration in which reprogramming data or rewritten software stored in the external storage 27 can be written into the first ROM 31 at the time of activation, there is concern that cost increases and processing becomes complicated, but the configuration can be realized without the occurrence of such a situation.

Second Embodiment

A second embodiment will be described below with reference to FIGS. 14 and 15.

In the second embodiment, the second core 32*b* copies the OTA application to the external storage 27, executes the OTA application in the external storage 27, and rewrites a software. Also in this case, there are a pattern in which rewritten software is generated in the first ROM 31 and a pattern in which rewritten software is generated in the external storage 27.

Figure 14:
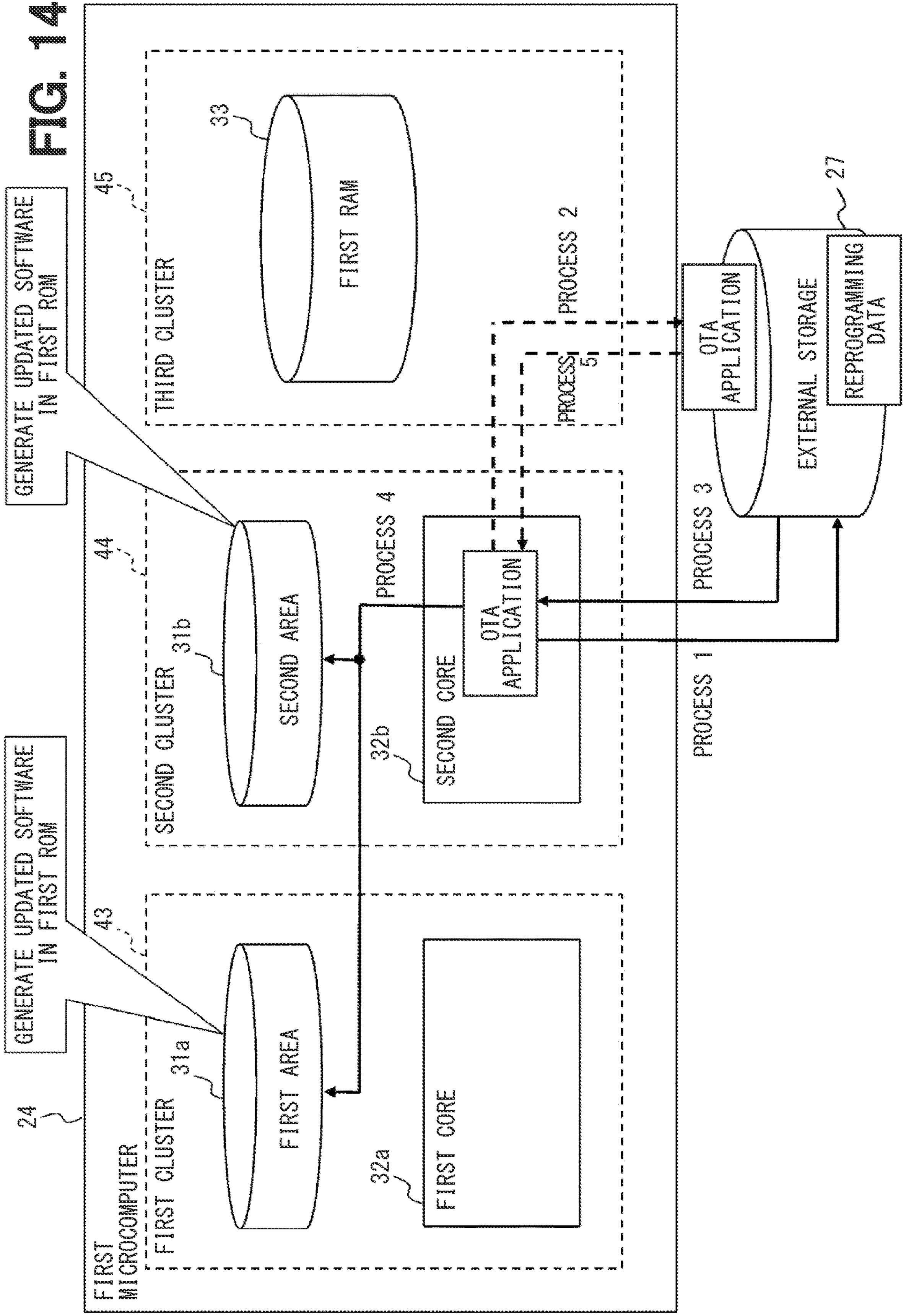
FIG. 14 is a diagram illustrating a second embodiment and describing the order of processes.

FIG. 14 illustrates the order of processes in the pattern in which rewritten software is generated in the first ROM 31. Process 1 to process 4 are as follows.

Process 1: The download data is stored in the external storage 27.

Process 2: The OTA application is copied to the external storage 27 and executed in the external storage 27.

Process 3: When the activation execution conditions are established, the reprogramming data is read from the external storage 27.

Process 4: The reprogramming data is written into the first ROM 31 and rewritten software is generated in the first ROM 31.

Process 5: The OTA application is executed by the second core 32*b* (restored).

Figure 15:
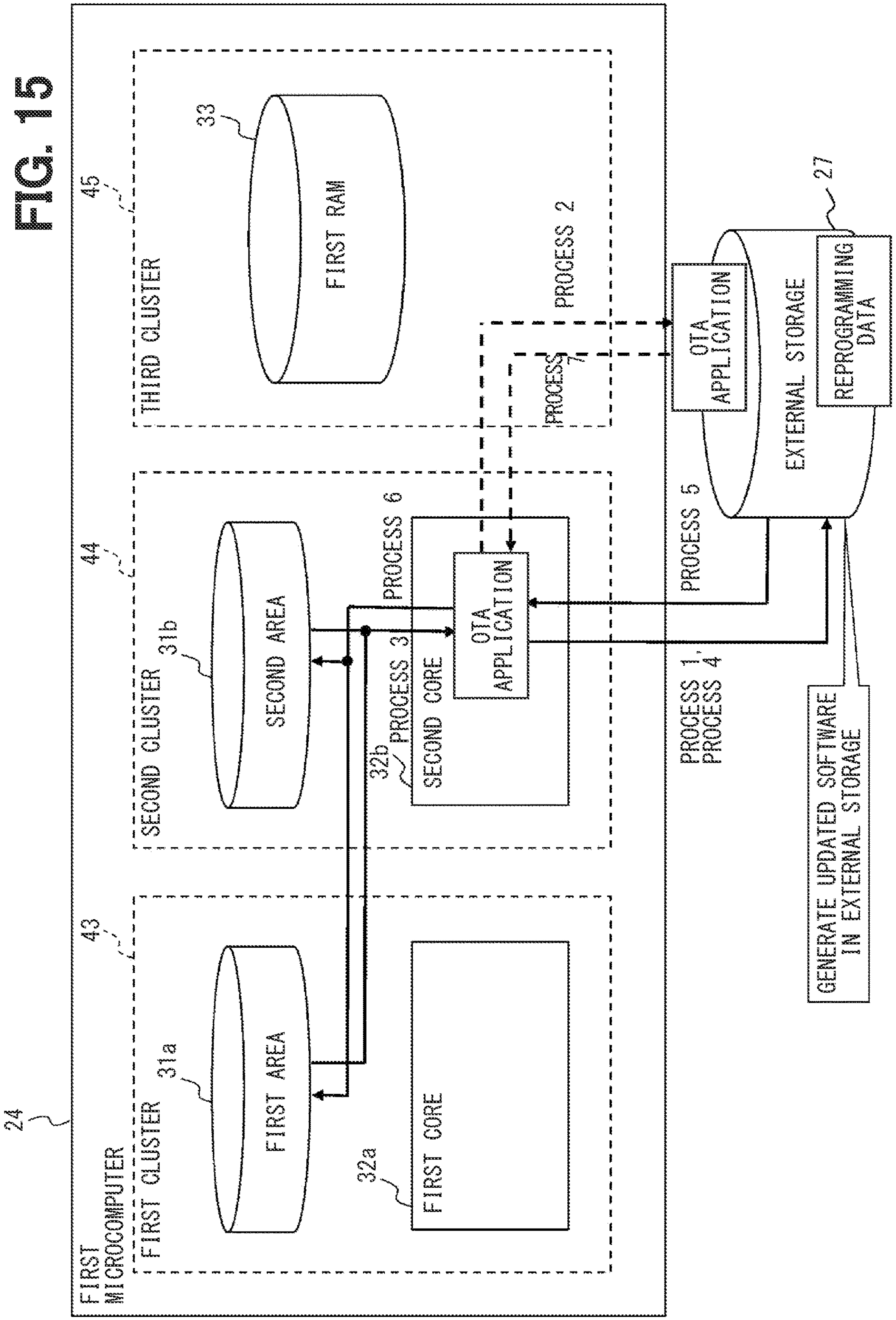
FIG. 15 is a diagram for describing the order of processes.

FIG. 15 illustrates the order of processes in the pattern in which rewritten software is generated in the external storage 27. Process 1 to process 6 are as follows.

Process 1: The download data is stored in the external storage 27.

Process 2: The OTA application is copied to the external storage 27 and executed in the external storage 27.

Process 3: The software before being rewritten is read from the first ROM 31.

Process 4: The software before being rewritten is written into the external storage 27 and rewritten software is generated in the external storage 27.

Process 5: When the activation execution conditions are established, the rewritten software is read from the external storage 27.

Process 6: The rewritten software is written into the first ROM 31.

According to the second embodiment, similarly to the first embodiment described above, the memory area of the first ROM 31 and the memory area of the external storage 27 are used as a pseudo-double-bank memory. Therefore, it is possible to rewrite the software by executing the OTA application in a state in which the memory area where the OTA application exists is separated from the memory area where the software exists. Accordingly, even in a configuration in which the first ROM 24 that is a double-bank memory is used as a pseudo-single-bank memory, it is possible to appropriately rewrite own software.

Third Embodiment

A third embodiment will be described below with reference to FIGS. 16 and 17.

The third embodiment is based on the premise that reprogramming data or rewritten software stored in the external storage 27 can be written into the first ROM 31 at the time of activation, the OTA application is executed by the second core 32*b* without not being copied to the first RAM 33 or the external storage 27, and the software is rewritten. Also in this case, there are a pattern in which rewritten software is generated in the first ROM 31 and a pattern in which rewritten software is generated in the external storage 27.

Figure 16:
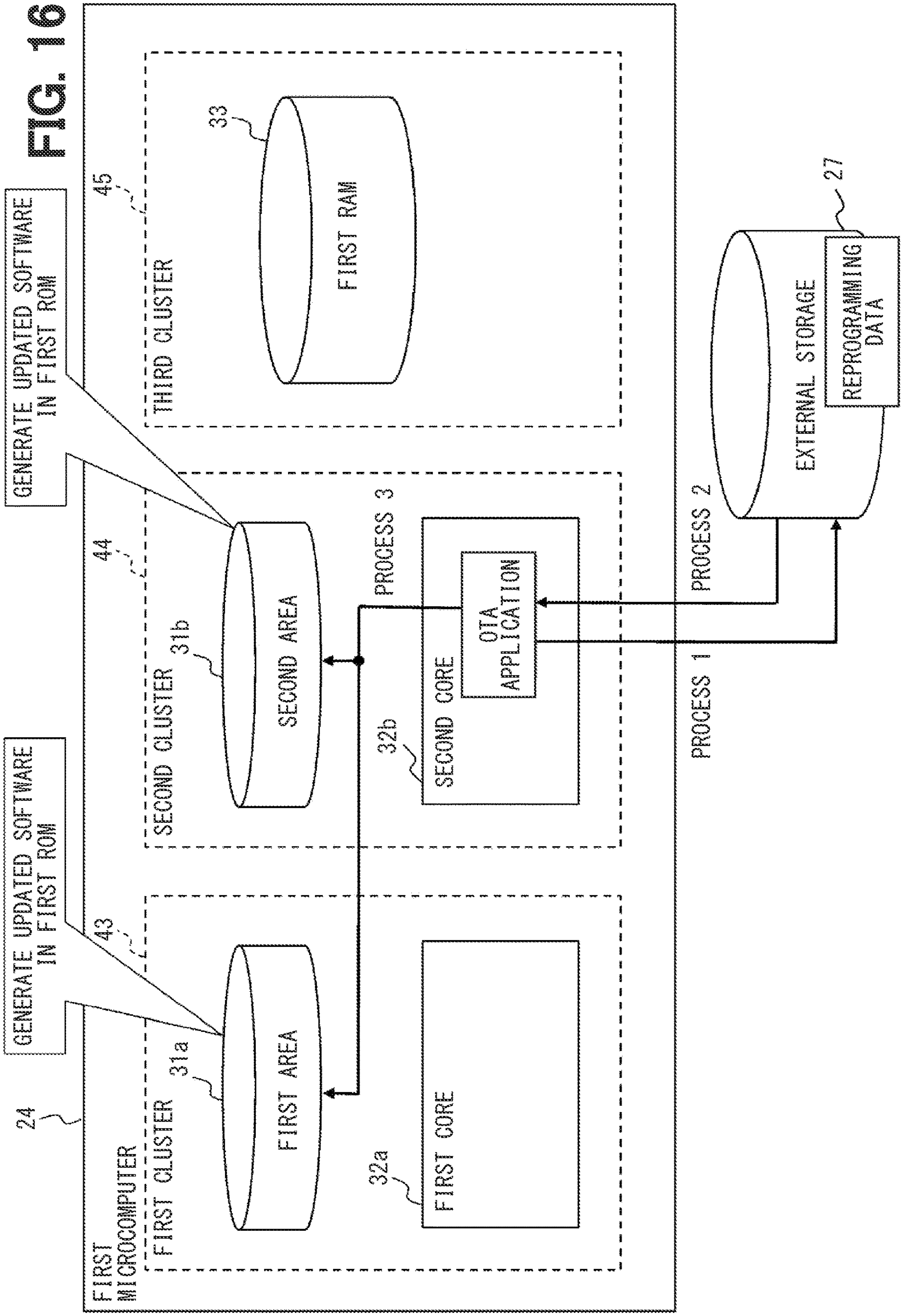
FIG. 16 is a diagram illustrating a third embodiment and describing the order of processes.

FIG. 16 illustrates the order of processes in the pattern in which rewritten software is generated in the first ROM 31. Process 1 to process 3 are as follows.

Process 1: The download data is stored in the external storage 27.

Process 2: When activation execution conditions are established, the reprogramming data is read from the external storage 27.

Process 3: The reprogramming data is written into the first ROM 31 and rewritten software is generated in the first ROM 31.

Figure 17:
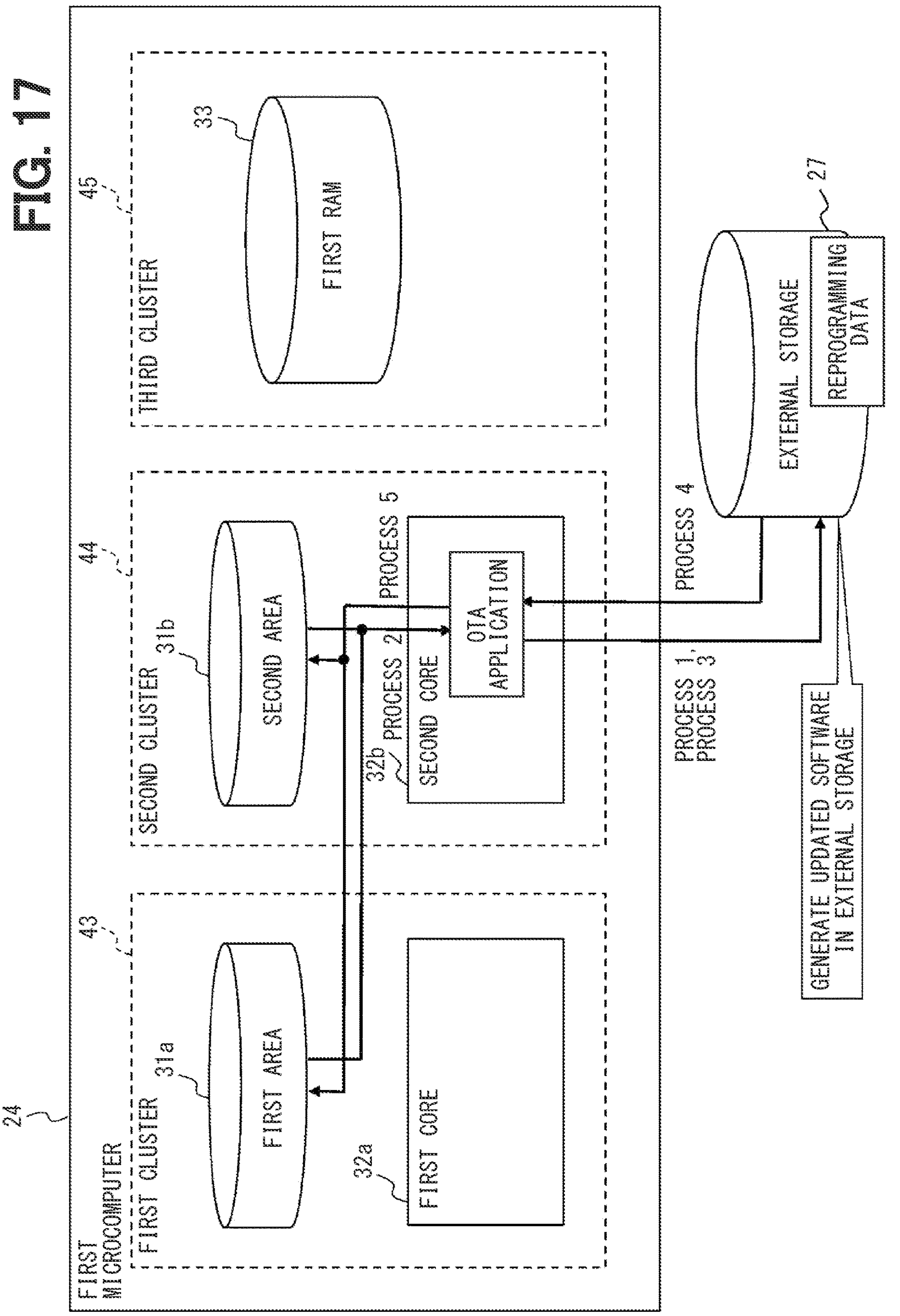
FIG. 17 is a diagram for describing the order of processes.

FIG. 17 illustrates the order of processes in the pattern in which rewritten software is generated in the external storage 27. Process 1 to process 5 are as follows.

Process 1: The download data is stored in the external storage 27.

Process 2: The software before being rewritten is read from the first ROM 31.

Process 3: The software before being rewritten is written into the external storage 27 and rewritten software is generated in the external storage 27.

Process 4: When the activation execution conditions are established, the rewritten software is read from the external storage 27.

Process 5: The rewritten software is written into the first ROM 31.

According to the third embodiment, similarly to the first embodiment described above, the memory area of the first ROM 31 and the memory area of the external storage 27 are used as a pseudo-double-bank memory. Therefore, it is possible to rewrite the software by executing the OTA application in a state in which the memory area where the OTA application exists is separated from the memory area where the software exists. Accordingly, even in a configuration in which the first ROM 24 that is a double-bank memory is used as a pseudo-single-bank memory, it is possible to appropriately rewrite own software.

Fourth Embodiment

A fourth embodiment will be described below with reference to FIG. 18.

The fourth embodiment is different from the first to third embodiments in that only the pattern in which rewritten software is generated in the first ROM 31 is provided.

Figure 18:
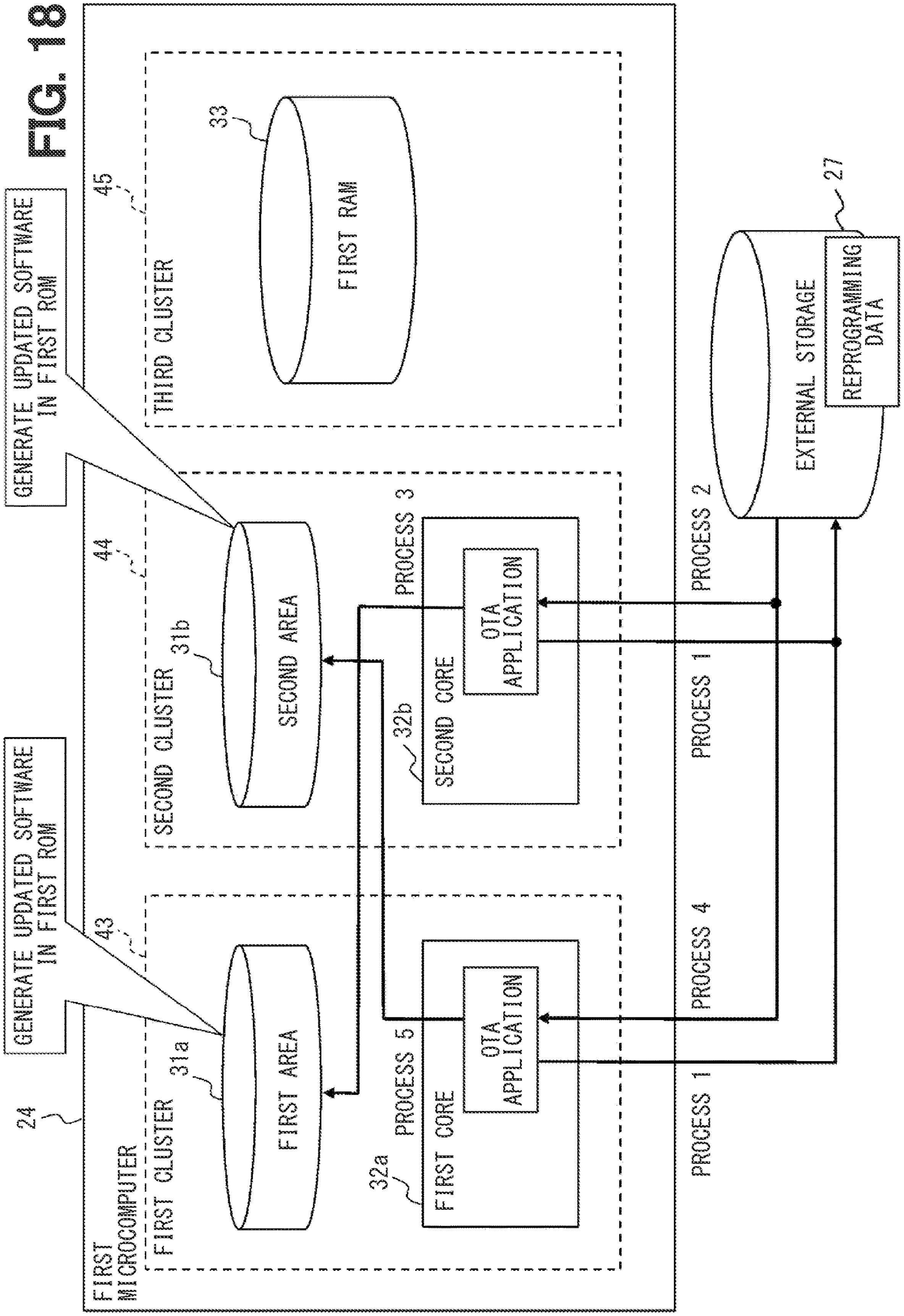
FIG. 18 is a diagram illustrating a fourth embodiment and describing the order of processes.

FIG. 18 illustrates the order of processes in the pattern in which rewritten software is generated in the first ROM 31. Process 1 to process 5 are as follows.

Process 1: The download data is stored in the external storage 27.

Process 2: When the activation execution conditions are established, the reprogramming data to be written into the first area 31*a* of the first ROM 31 is read from the external storage 27.

Process 3: The reprogramming data is written into the first area 31*a* of the first ROM 31, and rewritten software is generated in the first area 31*a* of the first ROM 31.

Process 4: When the activation execution conditions are established, the reprogramming data to be written into the second area 31*b* of the first ROM 31 is read from the external storage 27.

Process 5: The reprogramming data is written into the second area 31*b* of the first ROM 31, and rewritten software is generated in the second area 31*b* of the first ROM 31.

In the fourth embodiment, as illustrated in FIG. 18, the OTA application is executed by each of the first core 32*a* and the second core 32*b*. More specifically, the OTA application in the second area 31*b* of the first ROM 31 is executed by the second core 32*b*, and the software in the first area 31*a* of the first ROM 31 is updated. The OTA application in the first area 31*a* of the first ROM 31 is executed by the first core 32*a*, and the software in the second area 31*b* of the first ROM 31 is updated. With this configuration, the software in all the areas of the first ROM 31 is rewritten.

According to the fourth embodiment, similarly to the first embodiment described above, the memory area of the first ROM 31 and the memory area of the external storage 27 are used as a pseudo-double-bank memory. Therefore, it is possible to rewrite the software by executing the OTA application in a state in which the memory area where the OTA application exists is separated from the memory area where the software exists. Accordingly, even in a configuration in which the first ROM 24 that is a double-bank memory is used as a pseudo-single-bank memory, it is possible to appropriately rewrite own software.

FIG. 19 schematically illustrates a reprogramming data storage location, a rewritten software generation location, and an OTA application disposition location in the first to fourth embodiments described above.

Figure 20:
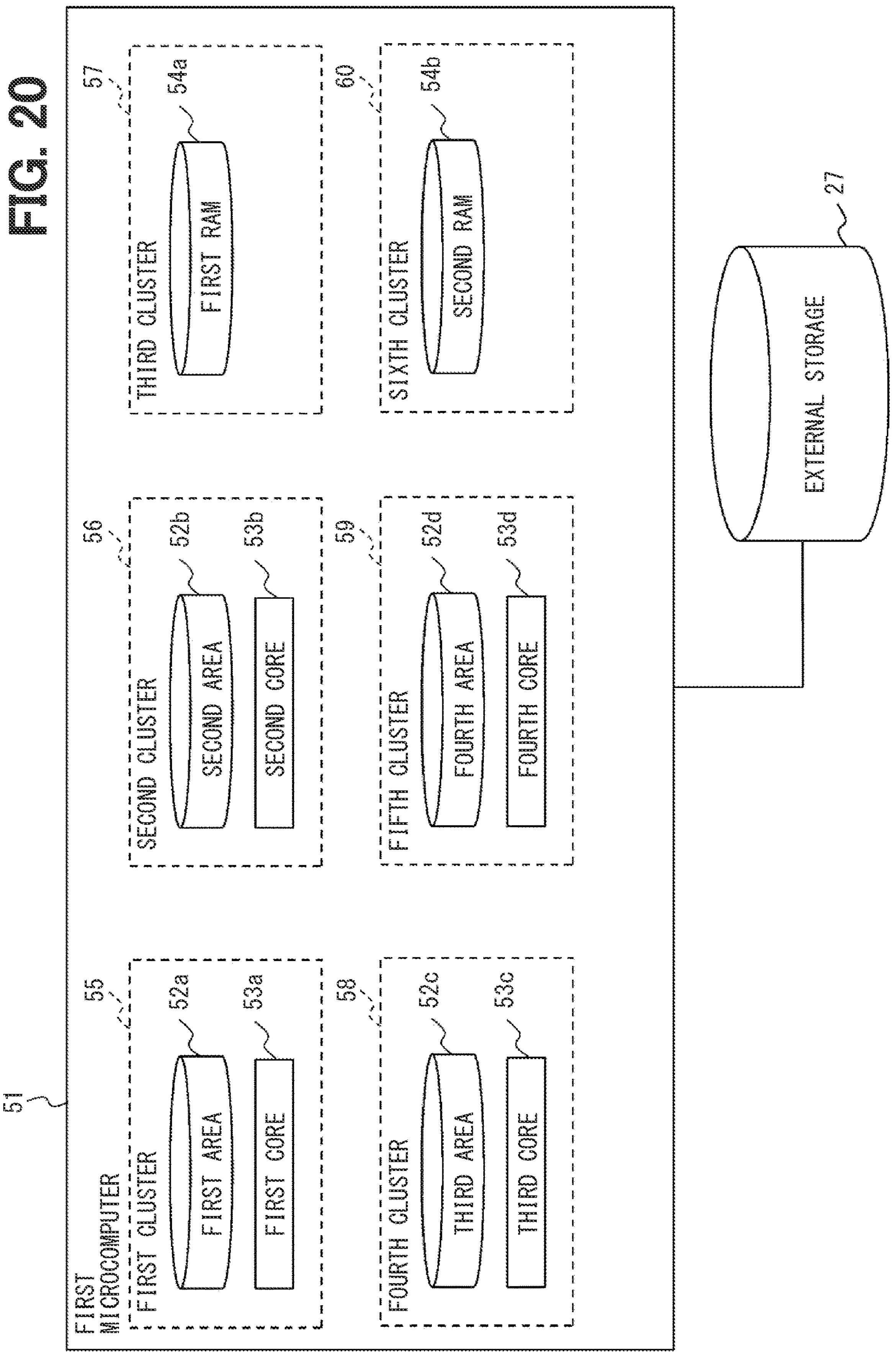
FIG. 20 is a diagram illustrating clusters inside the microcomputer.

As a configuration of the CGW 13, instead of the first microcomputer 24, a microcomputer with higher specifications than the first microcomputer 24 may be used. As illustrated in FIG. 20, the first microcomputer 51 is, for example, a system-on-chip (SoC), includes a first area 52*a* to a fourth area 52*d* as memory areas of a first ROM, and a first core 53*a* to a fourth core 53*d* as a first processor. A first cluster 55 is defined to include the first area 52*a* and the first core 53*a*, a second cluster 56 is defined to include the second area 52*b* and the second core 53*b*, and a third cluster 57 is defined to include the first RAM 54*a*. A fourth cluster 58 is defined to include the third area 52*c* and the third core 53*c*, a fifth cluster 59 is defined to include the fourth area 52*d* and the fourth core 53*d*, and a sixth cluster 60 is defined to include the second RAM 54*b*. The first cluster 55, the second cluster 56, and the third cluster 57 cooperate to function as a high-performance calculation unit, and the fourth cluster 58, the fifth cluster 59, and the sixth cluster 60 cooperate to function as a medium-performance calculation unit. Also in this case, in a case where self-reprogramming of the first microcomputer 51 is performed by using the external storage 27, the memory area of the first ROM and the memory area of the external storage 27 are used as a pseudo-double-bank memory, and thus software can be rewritten by executing the OTA application in a state in which the memory area where the OTA application exists is separated from the memory area where the software exists.

Other Embodiments

Although the present disclosure has been described in accordance with the examples, it is understood that the present disclosure is not limited to such examples or structures. The present disclosure includes various modification examples or variations within the scope of equivalents. Various combinations or forms as well as other combinations or forms including only one element, one or more elements, or one or less elements, fall within the scope or the concept of the present disclosure.

Although the case where the software is wirelessly rewritten by downloading the download data from the file server 8 has been exemplified, the tool 23 is connected to the DLC connector 22, and the download data transmitted from the tool 23 is downloaded via the DLC connector 22. Thus, the present disclosure can be applied to a case of rewriting software by wire.

In the above-described embodiment, the CGW 13 determines whether a rewrite target is the self or another ECU 19 based on the specification data provided by the OEM. The format of the specification data described in the embodiment is only an example, and information indicating whether a rewrite target is the self or another ECU 19 may be transmitted from the center device 3 as data separate from the specification data.

The control units and patterns thereof described in the present disclosure may be realized by a dedicated computer provided by configuring a processor and memory programmed to execute one or more functions embodied by the computer program. Alternatively, the control units and the patterns thereof described in the present disclosure may be realized by a dedicated computer provided by configuring the processor with one or more dedicated hardware logic circuits. Alternatively, the control units and the patterns described in the present disclosure may be realized by one or more dedicated computer including a combination of a processor and a memory programmed to execute one or more functions and a processor including one or more hardware logic circuits. The computer program may also be stored on a computer readable non-transitory tangible recording medium as instructions executed by a computer.

The present disclosure can be realized in various forms such as a program. The program may be stored in a computer-readable, non-transitory tangible storage medium as instructions to be executed by a computer. For example, the program may be stored in a flash memory, ROM, or the like.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle electronic control device comprising:

a microcomputer having a non-volatile memory that is capable of storing software including a program and data and includes a first area and a second area as memory areas, and a control unit that includes a first core and a second core and executes a rewrite program for rewriting the software with at least one of the first core and the second core;

an external storage provided within a vehicle and outside the microcomputer, the external storage being directly connected to the microcomputer and configured to temporarily store reprogramming data for updating the software; and an internal storage that is provided inside the microcomputer separately from the non-volatile memory, the first core, and the second core, and that is capable of executing a program;

wherein:

the control unit rewrites the software stored in the non-volatile memory by using a memory area of the external storage in a case where it is determined, based on specification data, that the software stored in the non-volatile memory of the microcomputer is to be rewritten; and the control unit copies the rewrite program to the internal storage, executes the rewrite program in the internal storage, transfers a program before being rewritten stored in the non-volatile memory to the external storage to generate rewritten software in the external storage, writes the generated rewritten software into the non-volatile memory, and thus rewrites the software stored in the non-volatile memory of the microcomputer.

2. A vehicle electronic control device comprising:

a microcomputer having a non-volatile memory that is capable of storing software including a program and data and includes a first area and a second area as memory areas, and a control unit that includes a first core and a second core and executes a rewrite program for rewriting the software with at least one of the first core and the second core; and an external storage provided within a vehicle and outside the microcomputer, the external storage being directly connected to the microcomputer and configured to temporarily store reprogramming data for updating the software;

wherein:

the external storage is capable of executing the rewrite program; and the control unit copies the rewrite program to the external storage, executes the rewrite program in the external storage, transfers a program before being rewritten stored in the non-volatile memory to the external storage to generate rewritten software in the external storage, writes the generated rewritten software into the non-volatile memory, and thus rewrites the software stored in the non-volatile memory of the microcomputer.

3. The vehicle electronic control device according to claim 1, wherein:

the microcomputer is defined as a first microcomputer;

the vehicle electronic control device further comprises a second microcomputer;

the first microcomputer is configured to directly communicate with the external storage via a dedicated line; and the second microcomputer is configured to communicate with the external storage via the first microcomputer.

4. The vehicle electronic control device according to claim 1, wherein:

the control unit determines, based on data acquired from the outside, that the first area or the second area is rewritten, and determines, based on the specification data, that the software stored in the non-volatile memory of the microcomputer is to be rewritten.

5. The vehicle electronic control device according to claim 1, wherein:

the control unit makes a request for an approval for activation, and rewrites the software stored in the non-volatile memory of the microcomputer based on the activation being approved.

6. The vehicle electronic control device according to claim 1, wherein:

the control unit rewrites the software stored in the non-volatile memory of the microcomputer while the vehicle is traveling.

7. A non-transitory computer readable storage medium storing a rewrite program causing a control unit of a vehicle electronic control device including a microcomputer having a non-volatile memory that is capable of storing software including a program and data and includes a first area and a second area as memory areas, and the control unit that includes a first core and a second core and executes a rewrite program for rewriting the software with at least one of the first core and the second core, an external storage provided within a vehicle and outside the microcomputer;

an internal storage that is provided inside the microcomputer separately from the non-volatile memory, the first core, and the second core, and that is capable of executing a program;

wherein:

the external storage is directly connected to the microcomputer and configured to temporarily store reprogramming data for updating the software, to execute:

a first procedure of determining, based on specification data, whether or not the software stored in the non-volatile memory of the microcomputer is to be rewritten; and a second procedure of rewriting the software stored in the non-volatile memory of the microcomputer by using a memory area of the external storage in a case where it is determined that the software stored in the non-volatile memory of the microcomputer is to be rewritten in the first procedure; and the control unit copies the rewrite program to the internal storage, executes the rewrite program in the internal storage, transfers a program before being rewritten stored in the non-volatile memory to the external storage to generate rewritten software in the external storage, writes the generated rewritten software into the non-volatile memory, and thus rewrites the software stored in the non-volatile memory of the microcomputer.

8. A non-transitory tangible computer readable storage medium storing a data structure of specification data distributed from an outside to a vehicle electronic control device and including information necessary when rewriting software including a program and data stored in a memory area of the vehicle electronic control device or another device, the data structure comprising information for identifying whether rewriting is a rewriting of software stored in the vehicle electronic control device or a rewriting of software stored in another device, wherein:

the specification data is referenced by a control unit of the vehicle electronic control device, the control unit comprising a processor and an internal storage provided inside a microcomputer separately from a non-volatile memory and the processor; and the control unit is configured to:

copy a rewrite program to the internal storage;

execute the rewrite program in the internal storage;

transfer software before being rewritten stored in the non-volatile memory to an external storage to generate rewritten software in the external storage; and write the generated rewritten software into the non-volatile memory, whereby the software stored in the non-volatile memory is rewritten in accordance with the specification data.

9. A vehicle electronic control device comprising:

a microcomputer having a non-volatile memory that is capable of storing software including a program and data and includes a first area and a second area as memory areas, and a processor that includes a first core and a second core and executes a rewrite program for rewriting the software with at least one of the first core and the second core;

an external storage provided within a vehicle and outside the microcomputer, the external storage being directly connected to the microcomputer and configured to temporarily store reprogramming data for updating the software; and an internal storage that is provided inside the microcomputer separately from the non-volatile memory, the first core, and the second core, and that is capable of executing a program;

wherein:

a memory area of the non-volatile memory and a memory area of the external storage are used as a pseudo-double-bank memory, causing the software stored in the non-volatile memory of the microcomputer to be rewritten; and the processor copies the rewrite program to the internal storage, executes the rewrite program in the internal storage, transfers a program before being rewritten stored in the non-volatile memory to the external storage to generate rewritten software in the external storage, writes the generated rewritten software into the non-volatile memory, and thus rewrites the software stored in the non-volatile memory of the microcomputer.

10. A non-transitory computer readable storage medium storing a rewrite program causing a control unit of a vehicle electronic control device including a microcomputer having a non-volatile memory that is capable of storing software including a program and data and includes a first area and a second area as memory areas, and the control unit that includes a first core and a second core and executes a rewrite program for rewriting the software with at least one of the first core and the second core, and an external storage provided within a vehicle and outside the microcomputer, the external storage being directly connected to the microcomputer and configured to temporarily store reprogramming data for updating the software, to execute:

a first procedure of determining, based on specification data, whether or not the software stored in the non-volatile memory of the microcomputer is to be rewritten; and a second procedure of rewriting the software stored in the non-volatile memory of the microcomputer by using a memory area of the external storage in a case where it is determined that the software stored in the non-volatile memory of the microcomputer is to be rewritten in the first procedure;

wherein:

the external storage is capable of executing the rewrite program; and the control unit copies the rewrite program to the external storage, executes the rewrite program in the external storage, transfers a program before being rewritten stored in the non-volatile memory to the external storage to generate rewritten software in the external storage, writes the generated rewritten software into the non-volatile memory, and thus rewrites the software stored in the non-volatile memory of the microcomputer.

11. A vehicle electronic control device comprising:

a microcomputer having a non-volatile memory that is capable of storing software including a program and data and includes a first area and a second area as memory areas, and a processor that includes a first core and a second core and executes a rewrite program for rewriting the software with at least one of the first core and the second core; and an external storage provided within a vehicle and outside the microcomputer, the external storage being directly connected to the microcomputer and configured to temporarily store reprogramming data for updating the software;

wherein:

a memory area of the non-volatile memory and a memory area of the external storage are used as a pseudo-double-bank memory, causing the software stored in the non-volatile memory of the microcomputer to be rewritten;

the external storage is capable of executing the rewrite program; and the processor copies the rewrite program to the external storage, executes the rewrite program in the external storage, transfers a program before being rewritten stored in the non-volatile memory to the external storage to generate rewritten software in the external storage, writes the generated rewritten software into the non-volatile memory, and thus rewrites the software stored in the non-volatile memory of the microcomputer.

* * * * *